(12) United States Patent
Singer et al.

(10) Patent No.: US 11,787,968 B2
(45) Date of Patent: Oct. 17, 2023

(54) COATING COMPOSITION

(71) Applicant: PPG Industries Ohio, Inc., Cleveland, OH (US)

(72) Inventors: Debra L. Singer, Wexford, PA (US); William H. Retsch, Jr., Allison Park, PA (US); Dennis A. Simpson, Sarver, PA (US); Kam Lun Lock, Orpington (GB); Michael G. Olah, Pittsburgh, PA (US); Hongying Zhou, Allison Park, PA (US); Maria Magdalena Vladan, Burjassot (ES)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 16/954,131

(22) PCT Filed: Dec. 13, 2018

(86) PCT No.: PCT/US2018/065409
§ 371 (c)(1),
(2) Date: Jun. 15, 2020

(87) PCT Pub. No.: WO2019/118697
PCT Pub. Date: Jun. 20, 2019

(65) Prior Publication Data
US 2021/0163778 A1  Jun. 3, 2021

(30) Foreign Application Priority Data
Dec. 15, 2017 (EP) .................................. 17207692

(51) Int. Cl.
| C09D 133/02 | (2006.01) |
| C08F 220/18 | (2006.01) |
| C08F 2/04 | (2006.01) |
| C08F 2/22 | (2006.01) |
| C08F 220/06 | (2006.01) |
| C08K 5/00 | (2006.01) |

(52) U.S. Cl.
CPC ............. C09D 133/02 (2013.01); C08F 2/04 (2013.01); C08F 2/22 (2013.01); C08F 220/06 (2013.01); C08F 220/1806 (2020.02); C08K 5/0025 (2013.01)

(58) Field of Classification Search
CPC . C09D 133/02; C08F 2/22; C08F 2/04; C08F 220/06; C08F 220/1806; C08F 220/04; C08K 5/0025; C08K 5/175; C08L 33/00
See application file for complete search history.

(56) References Cited

U.S. PATENT DOCUMENTS

| 3,919,154 A | * | 11/1975 | Chang ................ C09D 133/064 524/512 |
| 4,101,606 A | | 7/1978 | Cenci et al. |
| 4,243,569 A | * | 1/1981 | Koleske .................. C08K 5/10 524/317 |
| 5,840,384 A | * | 11/1998 | Noda .................. C09D 133/064 428/35.8 |
| 5,889,126 A | * | 3/1999 | Kaplan ................ C08G 63/914 525/444 |
| 2012/0149820 A1 | | 6/2012 | Fuhry et al. |
| 2020/0056066 A1 | * | 2/2020 | Gibanel ............... C09D 133/10 |

FOREIGN PATENT DOCUMENTS

| CN | 101040016 A | 9/2007 |
| WO | 2006/045017 A1 | 4/2006 |
| WO | 2016/196190 A1 | 12/2016 |

OTHER PUBLICATIONS

Office Action issued in Chinese Application No. 201880083725.8, dated Jan. 20, 2023.

* cited by examiner

*Primary Examiner* — Robert C Boyle

(57) ABSTRACT

The present invention relates to a coating composition, the coating composition comprising: a) a solution polymerised acrylic material; b) an emulsion polymerised acrylic latex material, wherein one or both of the solution polymerised acrylic material and the emulsion polymerised acrylic latex material have acid functionality; and c) a crosslinker material operable to crosslink the acid functionality on the solution polymerised acrylic material and/or emulsion polymerised acrylic latex material, the present invention also extends to a food and/or beverage package coated on at least a portion thereof with said coating composition.

14 Claims, No Drawings

COATING COMPOSITION

FIELD

The present invention relates to a coating composition, in particular to a coating composition comprising a solution polymerised acrylic material, an emulsion polymerised acrylic latex material, wherein one or both of the solution polymerised acrylic material and the emulsion polymerised acrylic latex material have acid functionality, and a crosslinker material operable to crosslink the acid functionality on the solution polymerised acrylic material and/or emulsion polymerised acrylic latex material. The present invention extends to a food and/or beverage packaging coated on at least a portion thereof with a coating composition, in particular with a coating composition comprising a solution polymerised acrylic material and an emulsion polymerised acrylic latex material, wherein one or both of the solution polymerised acrylic material and the emulsion polymerised acrylic latex material have acid functionality.

BACKGROUND

The application of various treatment and pre treatment solutions to metals to retard or inhibit corrosion is well established. This is particularly true in the area of metal food and/or beverage packaging, such as food and/or beverage cans. Coatings are applied to the interior of such containers to prevent the contents from contacting the metal of the container. Contact between the metal and the food and/or beverage can lead to corrosion of the metal container, which can then contaminate the food and/or beverage. This is of particular concern when the contents of the can are acidic in nature, such as tomato-based products and soft drinks for example. The coatings applied to the interior of food and/or beverage cans also helps prevent corrosion in the head space of the cans, which is the area between the fill line of the food product and the can lid; corrosion in the head space is particularly problematic with food products having a high salt content.

Various epoxy-based coatings and polyvinyl chloride-based coatings have been used in the past to coat the interior of metal cans to prevent corrosion. The recycling of materials containing polyvinyl chloride or related halide-containing vinyl polymers can generate toxic by-products. Moreover, these polymers are typically formulated with epoxy-functional plasticizers. In addition, epoxy-based coatings are prepared from monomers such as bisphenol A and bisphenol A diglycidylether ("BADGE"). BPA is perceived as being harmful to human health and it is therefore desirable to eliminate it from coatings. Derivatives of BPA such as diglycidyl ethers of bisphenol A (BADGE), epoxy novolak resins and polyols prepared from BPA and bisphenol F (BPF) are also perceived to be problematic. While attempts have been made to scavenge the residual unreacted epoxy with, for example, acid functional polymers, this does not adequately address the problem and some free BADGE or its by-products will still remain. Government authorities, particularly in Europe, are becoming even more restrictive on the amount of free BADGE or its by-products that are acceptable. Thus, there is a need for food and/or beverage cans that are substantially free from BADGE, epoxy and vinyl products.

It is an object of aspects of the present invention to provide one or more solutions to the above mentioned or other problems.

SUMMARY

According to a first aspect of the present invention there is provided a coating composition, the coating composition comprising:
   a) a solution polymerised acrylic material;
   b) an emulsion polymerised acrylic latex material, wherein one or both of the solution polymerised acrylic material and the emulsion polymerised acrylic latex material have acid functionality; and
   c) a crosslinker material operable to crosslink the acid functionality on the solution polymerised acrylic material and/or emulsion polymerised acrylic latex material.

According to a second aspect of the present invention there is provided a food and/or beverage package coated on at least a portion thereof with a coating, the coating being derived from a coating composition, the coating composition comprising:
   a) a solution polymerised acrylic material;
   b) an emulsion polymerised acrylic latex material, wherein one or both of the solution polymerised acrylic material and the emulsion polymerised acrylic latex material have acid functionality.

According to a third aspect of the present invention there is provided a food and/or beverage package coated on at least a portion of an interior surface thereof with a coating, the coating being derived from a coating composition, the coating composition comprising:
   a) a solution polymerised acrylic material;
   b) an emulsion polymerised acrylic latex material, wherein one or both of the solution polymerised acrylic material and the emulsion polymerised acrylic latex material have acid functionality.

Suitably, the coating compositions according to the second and/or third aspects of the present invention may further comprise c) a crosslinker material operable to crosslink the acid functionality on the solution polymerised acrylic material and/or emulsion polymerised acrylic latex material.

Thus, according to a fourth aspect of the present invention there is provided a food and/or beverage package coated on at least a portion thereof with a coating, the coating being derived from a coating composition, the coating composition comprising:
   a) a solution polymerised acrylic material;
   b) an emulsion polymerised acrylic latex material, wherein one or both of the solution polymerised acrylic material and the emulsion polymerised acrylic latex material have acid functionality; and
   c) a crosslinker material operable to crosslink the acid functionality on the solution polymerised acrylic material and/or emulsion polymerised acrylic latex material.

According to a fifth aspect of the present invention there is provided a food and/or beverage package coated on at least a portion of an interior surface thereof with a coating, the coating being derived from a coating composition, the coating composition comprising:
   a) a solution polymerised acrylic material;
   b) an emulsion polymerised acrylic latex material, wherein one or both of the solution polymerised acrylic material and the emulsion polymerised acrylic latex material have acid functionality; and
   c) a crosslinker material operable to crosslink the acid functionality on the solution polymerised acrylic material and/or emulsion polymerised acrylic latex material.

DESCRIPTION

It has surprisingly and advantageously been found by the present inventors that the coating compositions of the present invention can comprise both a solution polymerised acrylic material and an emulsion polymerised acrylic latex material. Advantageously, the coating compositions of the present invention have improved adhesion than would typically be expected, for example, the coating compositions of the present invention have improved adhesion compared to coatings comprising only one of a solution polymerised acrylic material or an emulsion polymerised acrylic latex material.

The coating composition of the present invention comprises a solution polymerised acrylic material. By "solution polymerised" and like terms as used herein is meant a polymer that is formed by a polymerisation method whereby one or more monomers are substantially dissolved in a solvent and polymerised. Once said monomers have been polymerised, the resultant solution polymerised acrylic material is suitably substantially soluble in said solvent.

The coating composition may comprise any suitable solution polymerised acrylic material. The solution polymerised acrylic material is suitably formed from one or more acrylic monomer(s). Suitable acrylic monomers will be well known to a person skilled in the art. Suitably, the solution polymerised acrylic material may be formed from more than one acrylic monomer. Suitable acrylic monomers include, but are not limited to, alkyl (alk)acrylate, such as $C_1$ to $C_6$ alkyl ($C_1$ to $C_6$ alk)acrylate, for example, $C_1$ to $C_6$ alkyl (meth)acrylate, and (alk)acrylic acid, such as ($C_1$ to $C_6$ alk)acrylic acid. The acrylic monomers may comprise one or more functional group, such as an epoxy group. For example, the acrylic monomers may comprise glycidyl methacrylate.

The terms "(alk)acrykate", "(meth)acrylate" and like terms as used herein are used conventionally and herein to refer to both alkacrylate and acrylate, such as methacrylate and acrylate.

Examples of suitable acrylic monomers include, but are not limited to, acrylic acid, methacrylic acid, methyl acrylate; methyl methacrylate; ethyl acrylate; ethyl methacrylate; propyl acrylate; propyl methacrylate; butyl acrylate; butyl methacrylate, isobornyl acrylate, isobornyl methacrylate, hydroxyethyl acrylate, hydroxyethyl methacrylate, 2-ethylhexyl acrylate, 2-ethylhexyl methacrylate, glycidyl methacrylate; ethylene glycol diacrylate; ethylene glycol dimethacrylate; 1,6-hexanediol diacrylate; 1,6-hexanediol dimethacrylate; 4-hydroxybutyl acrylate; 4-hydroxybutyl methacrylate; allyl methacrylate; benzyl methacrylate; phosphate esters of 2-hydroxyethyl methacrylate; those sold under the trade name SIPOMER such as SIPOMER PAM-100, SIPOMER PAM-200 and SIPOMER PAM-300 (phosphate esters of polypropylene glycol monoacrylate commercially available from Solvay); and combinations thereof. Any other acrylic monomers known to those skilled in the art could also be used.

Suitably, the solution polymerised acrylic material may comprise acrylic acid, methacrylic acid, ethyl acrylate, ethyl methacrylate, butyl methacrylate, butyl acrylate or combinations thereof.

Suitably, the solution polymerised acrylic material may comprise acrylic acid, methacrylic acid, butyl methacrylate, butyl acrylate or combinations thereof.

Suitably, the solution polymerised acrylic material may comprise acrylic acid, butyl methacrylate, butyl acrylate or combinations thereof.

When the solution polymerised acrylic material is formed from acrylic acid, butyl methacrylate and butyl acrylate, the acrylic acid, butyl methacrylate and butyl acrylate may be present in any suitable weight ratio. The weight ratio of acrylic acid:butyl methacrylate:butyl acrylate may be 1:1 to 10:1 to 5, suitably 1:1 to 5:1 to 3, such as 1:1 to 3:1 to 2, or even 1:1.5 to 2.5:1.5 to 2.

Suitably, the solution polymerised acrylic material may comprise methacrylic acid and/or acrylic acid. The solution polymerised acrylic material may comprise any suitable amount of methacrylic acid and/or acrylic acid. Suitably, the solution polymerised acrylic material may comprise from 5 to 60 wt %, such as from 10 to 50 wt %, such as from 10 to 40 wt %, such as from 10 to 30 wt %, such as from 15 to 30 wt %, or even from 15 to 25 wt % methacrylic acid and/or acrylic acid based on the total weight of the monomers.

The solution polymerised acrylic material may be formed from one or more additional ethylenically unsaturated monomer(s). Suitable additional ethylenically unsaturated monomers include, but are not limited to, aryl substituted ethylenically unsaturated monomers such as, for example, styrene; ethylenically unsaturated nitriles such as, for example, acrylonitrile or methacrylonitrile; and combinations thereof.

Suitably, the solution polymerised acrylic material may be substantially free, may be essentially free or may be completely free of styrene. By substantially free in relation to styrene, is meant that the solution polymerised acrylic material is formed from monomers which comprise less than 5 wt % of styrene based on the total weight of the monomers from which the solution polymerised acrylic material is formed. By essentially free in relation to styrene, is meant that the solution polymerised acrylic material is formed from monomers which comprise less than 1 wt % of styrene based on the total weight of the monomers from which the solution polymerised acrylic material is formed. By completely free in relation to styrene, is meant that the solution polymerised acrylic material is formed from monomers which comprise less than 0.01 wt % of styrene based on the total weight of the monomers from which the solution polymerised acrylic material is formed. Suitably, solution polymerised acrylic material is formed from monomers which comprise no, i.e. 0 wt %, styrene based on the total weight of the monomers from which the solution polymerised acrylic material is formed.

Advantageously, the solution polymerised acrylic material may be completely free of styrene.

The solution polymerised acrylic material is suitably formed by a solution polymerisation method. Suitable solution polymerisation methods will be well known to a person skilled in the art. The solution polymerisation method suitably comprises a plurality of components, which may be referred to as a solution polymerisation reaction mixture.

The solution polymerisation reaction mixture suitably comprises a solution polymerisation monomer component. The solution polymerisation monomer component suitably comprises one or more acrylic monomer(s) as described above. The solution polymerisation monomer component may optionally comprise additional ethylenically unsaturated monomers as described above.

The solution polymerisation reaction mixture may further comprise an initiator. Suitably, the initiator may be a free radical initiator. Suitable initiators include, but are not limited to, tertiary butyl perbenzoate; tert butyl peroxy 3,5,5 trimethylhexanoate; tertiary butyl peroxy 2-ethyl hexanoate; di tertiary butyl peroxide; tertiary butyl peracetate; tertiary butyl peroctoate; azo type initiators such as, for example, 2,2'-azobis(isobutyronitrile), 2,2'-Azobis(2-methylbutyronitrile), 2,2'-Azobis(2,4-dimethyl valeronitrile) and 2,2'-Azobis(4-methoxy-2,4-dimethyl valeronitrile); persulphate initiators such as, for example, ammonium persulphate, sodium persulphate or potassium persulphate; and combinations thereof. Suitably, the initiator may be soluble in the solution polymerisation reaction mixture. Suitably, the initiator may be soluble in the monomer mixture.

Suitably, the initiator may comprise tert butyl peroxy 3,5,5 trimethylhexanoate, tertiary butyl peroctoate or combinations thereof.

The solution polymerisation reaction mixture suitably comprises a solvent or mixture of solvents. Suitable solvents will be well known to a person skilled in the art. Examples of suitable solvents include, but are not limited to, alcohols such as, for example, n-butanol, pentanol or hexanol; glycols such as, for example, butyl glycol; glycol ethers such as, for example, 2-butoxy ethanol, 1-methoxy propan-2-ol or dipropylene glycol mono methyl ether; and combinations thereof. Suitably, the solvent may comprise a mixture of solvents, such as n-butanol and butyl glycol. It will be appreciated by a person skilled in the art that the solvent or mixture of solvents is typically chosen such that the monomer mixture is substantially soluble in said solvent or mixture of solvents.

Suitably, the solution polymerisation monomer component is caused to undergo polymerisation in the solvent or mixture of solvents to form the solution polymerised acrylic material. Thus, the solution polymerisation of the solution polymerisation monomer component is typically carried out as a free radical initiated solution polymerisation in a solvent or mixture of solvents.

Solution polymerisation is typically carried out in a suitable reaction vessel. The solution polymerisation monomer component, initiator and/or solvent or mixture of solvents may be added to the reaction vessel in any suitable order. For example, the solvent or mixture of solvents may be added to the reaction vessel before the solution polymerisation monomer component and/or initiator are added to the reaction vessel. Suitably, the solution polymerisation monomer component and initiator are added to the reaction vessel at the same time. The solution polymerisation monomer component and/or initiator may be added to the reaction vessel over any suitable period of time. The solution polymerisation monomer component and/or initiator may be added to the reaction vessel over a time period of 0 to 12 hours, suitably 30 minutes to 8 hours, such as 1 hour to 6 hours, or even 2 hours to 4 hours. Suitably, the solution polymerisation monomer component and/or initiator may be added to the reaction vessel over a time period of 3 hours. For the avoidance of doubt, when the solution polymerisation monomer component and/or initiator are added over a time period of 0 hours, all of the solution polymerisation monomer component and/or initiator are added at the same time (i.e. in one single addition).

Solution polymerisation may be carried out at any suitable temperature. Suitably, solution polymerisation may be carried out at an elevated temperature. Solution polymerisation may be carried out at a temperature from 80° C. to 200° C., suitably from 100 to 180° C., such as from 120 to 160° C., or even from 130 to 150° C. Suitably, solution polymerisation may be carried out at a temperature from 135 to 140° C. Suitably, solution polymerisation may be carried out at reflux.

The solution polymerised acrylic material suitably comprises pendant acid groups such that the solution polymerised acrylic material is acid-functional. The acid groups of the acid-functional solution polymerised acrylic material may be at least partially neutralised. The acid groups of the acid-functional solution polymerised acrylic material may be at least partially neutralised by contacting said acid-functional solution polymerised acrylic material with a neutraliser. Thus, suitably, the solution polymerised acrylic material may comprise a neutraliser. Suitable neutralisers will be well known to a person skilled in the art. Examples of suitable neutralisers include, but are not limited to tertiary amines such as, for example, dimethylethanolamine (DMEA), trimethyl amine, methyl diethanol amine, ethyl methyl ethanol amine, dimethyl ethyl amine, dimethyl propyl amine, dimethyl 3-hydroxy-1-propyl amine, dimeythylbenzyl amine, dimethyl 2-hydroxy-1-propyl amine, diethyl methyl amine, dimethyl 1-hydroxy-2-propyl amine, triethyl amine, tributyl amine, N-methyl morpholine; ammonia; hydrazine; metallic aluminium; metallic zinc; water-soluble oxides of the elements Li, Na, K, Mg, Ca, Fe(II) and Sn(II); water-soluble hydroxides of the elements Li, Na, K, Mg, Ca, Fe(II) and Sn(II); water-soluble carbonates of the elements Li, Na, K, Mg, Ca, Fe(II) and Sn(II); and combinations thereof. Suitably, the neutraliser may comprise a tertiary amine. Suitably, the neutraliser may comprise dimethylethanolamine (DMEA).

Any suitable amount of neutraliser may be added to the acid-functional solution polymerised acrylic material. The acid-functional solution polymerised acrylic material may be at least 10% neutralised, suitably at least 20% neutralised, such as at least 30% neutralised, such as at least 40%, or even at least 50% neutralised with the neutraliser. By, for example, 'at least 20% neutralised' is meant that at least 20% of the available acid groups of the solution polymerised acrylic material are neutralised. A person skilled in the art will therefore appreciate that at least 30%, at least 40%, at least 50% neutralised etc. means that at least 30%, at least 40%, at least 50% of the available acid groups of the solution polymerised acrylic material are neutralised. Suitably, the acid-functional solution polymerised acrylic material may be 50% neutralised with the neutraliser. For example, at least 0.2, suitably at least 0.3, such as at least 0.4, or even at least 0.5 equivalents of neutraliser may be added to the solution polymerised acrylic material per equivalent of acid groups.

The solution polymerised acrylic material may be substantially dissolved and/or dispersed in water. Suitably, the solution polymerised acrylic material may be substantially dissolved in water. The solution polymerised acrylic material may be substantially dissolved and/or dispersed in water before, during or after the addition of neutraliser. Suitably, the solution polymerised acrylic material may be substantially dissolved and/or dispersed in water during the addition of neutraliser. Therefore, suitably, the solution polymerised acrylic material may be formed in one or more solvent and subsequently substantially dissolved and/or dispersed in water. Suitably, the solution polymerised acrylic material may be formed in one or more solvent and subsequently substantially dissolved in water. Suitably, the solution polymerised acrylic material has sufficient functionality such that it may be substantially dissolved in water.

The solution polymerised acrylic material may have any suitable number-average molecular weight (Mn). The solution polymerised acrylic material may have an Mn from 500 to 250,000 Daltons (Da=g/mole), suitably from 500 to 100,000 Da, such as from 1,000 to 50,000 Da, such as from 2,500 to 20,000 Da, or even from 4,000 to 10,000 Da.

The number-average molecular weight may be measured by any suitable method. Techniques to measure the number-average molecular weight will be well known to a person skilled in the art. Suitably, and as reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF retention time marker: toluene, sample concentration: 2 mg/ml).

The solution polymerised acrylic material may have any suitable weight-average molecular weight (Mw). The solution polymerised acrylic material may have an Mw from 500 to 250,000 Daltons (Da=g/mole), suitably from 1,000 to 200,000 Da, such as from 2,500 to 100,000 Da, such as from 5,000 to 75,000 Da, such as from 10,000 to 50,000 Da, such as from 10,000 to 30,000 Da, or even from 15,000 to 25,000 Da.

A person skilled in the art will appreciate that techniques to measure the number-average molecular weight may also be applied to measure the weight-average molecular weight.

The solution polymerised acrylic material may have any suitable acid value (AV) expressed on solids. The solution polymerised acrylic material may have an AV expressed on solids of from 0 to 400 mg KOH/g, suitably from 5 to 350 mg KOH/g, such as from 10 to 250 mg KOH/g, such as from 20 to 200 mg KOH/g, such as from 30 to 150 mg KOH/g, such as from 40 to 100 mg KOH/g, or even from 50 to 80 mg KOH/g.

The solution polymerised acrylic material may have any suitable acid value (AV) expressed on solution. Suitably, the solution is a 50 wt % solution in one or more solvent(s). The solution polymerised acrylic material may have an AV expressed on solution of from 0 to 200 mg KOH/g, suitably from 2.5 to 175 mg KOH/g, such as from 5 to 125 mg KOH/g, such as from 10 to 100 mg KOH/g, such as from 15 to 75 mg KOH/g, such as from 20 to 50 mg KOH/g, or even from 25 to 40 mg KOH/g.

The acid value (AV) expressed on solids may be measured by any suitable method. Methods to measure AV will be well known to a person skilled in the art. Suitably, the AV is determined by titration with 0.1M methanolic potassium hydroxide (KOH) solution. In such a method, a sample of solid polymer (typically, 0.1 to 3 g) is weighed accurately into a conical flask and is dissolved, using light heating and stirring as appropriate, in 25 ml of dimethyl formamide containing phenolphthalein indicator. The solution is then cooled to room temperature and titrated with the 0.1M methanolic potassium hydroxide solution. The resulting acid number is expressed in units of mg KOH/g and is calculated using the following equation:

$$\text{Acid value} = \frac{\text{titre of KOH solution (ml)} \times \text{molarity KOH solution (M)} \times 56.1}{\text{weight of solid sample (g)}}$$

It will be appreciated by a person skilled in the art that the method for measuring the acid value (AV) expressed on solution is the same as described above for the acid value (AV) expressed on solids with the exception that the polymer is added to the 25 ml of dimethyl formamide containing phenolphthalein indicator as a 50 wt % solution in one or more solvent(s).

The solution polymerised acrylic material may have any suitable glass transition temperature (Tg). The solution polymerised acrylic material may have a Tg from 0 to 100° C., such as from 0 to 75° C., such as from 0 to 50° C., or even from 0 to 25° C.

The Tg of the solution polymerised acrylic material may be measured by any suitable method. Methods to measure Tg will be well known to a person skilled in the art. As reported herein, the Tg may be measured according to ASTM D6604-00 (2013) ("Standard Practice for Glass Transition Temperatures of Hydrocarbon Resins by Differential Scanning Calorimetry". Heat-flux differential scanning calorimetry (DSC), sample pans: aluminium, reference: blank, calibration: indium and mercury, sample weight: 10 mg, heating rate: 20° C./min).

The coating composition of the present invention comprises an emulsion polymerised acrylic latex material. By "emulsion polymerised" and like terms as used herein is meant a polymer that is formed by a polymerisation method which starts with an emulsion comprising, at least, water and one or more monomer(s) that are substantially insoluble in the said water. Typically, the one or more monomer(s) form an oil phase in the aqueous phase (water). The resultant emulsion polymerised acrylic latex material is in the form of a stable emulsion of polymer microparticles in the aqueous medium.

The coating composition may comprise any suitable emulsion polymerised acrylic latex material. The emulsion polymerised acrylic latex material may be formed from one or more acrylic monomer(s). Suitable acrylic monomers are as described above in relation to the solution polymerised acrylic material.

Suitably, the emulsion polymerised acrylic latex material may be substantially free, may be essentially free or may be completely free of styrene. By substantially free in relation to styrene, is meant that the emulsion polymerised acrylic latex material is formed from monomers which comprise less than 5 wt % of styrene based on the total weight of the monomers from which the emulsion polymerised acrylic latex material is formed. By essentially free in relation to styrene, is meant that the emulsion polymerised acrylic latex material is formed from monomers which comprise less than 1 wt % of styrene based on the total weight of the monomers from which the emulsion polymerised acrylic latex material is formed. By completely free in relation to styrene, is meant that the emulsion polymerised acrylic latex material is formed from monomers which comprise less than 0.01 wt % of styrene based on the total weight of the monomers from which the emulsion polymerised acrylic latex material is formed. Suitably, emulsion polymerised acrylic latex material is formed from monomers which comprise no, i.e. 0 wt %, styrene based on the total weight of the monomers from which the emulsion polymerised acrylic latex material is formed.

Advantageously, the emulsion polymerised acrylic latex material may be completely free of styrene.

Suitably, therefore, the solution polymerised acrylic material and/or the emulsion polymerised acrylic latex material may be completely free of styrene. Suitably, the solution polymerised acrylic material and the emulsion polymerised acrylic latex material may be completely free of styrene.

Suitably, the emulsion polymerised acrylic latex material may comprise acrylic acid, methacrylic acid, ethyl acrylate, ethyl methacrylate, butyl methacrylate, butyl acrylate, methyl methacrylate or combinations thereof.

Suitably, the emulsion polymerised acrylic latex material may comprise acrylic acid, methacrylic acid, butyl methacrylate, butyl acrylate or combinations thereof.

Suitably, the emulsion polymerised acrylic latex material may comprise acrylic acid, butyl methacrylate, butyl acrylate, methyl methacrylate or combinations thereof.

When the emulsion polymerised acrylic latex material is formed from acrylic acid, butyl methacrylate, butyl acrylate, methyl methacrylate, the acrylic acid, butyl methacrylate, butyl acrylate, methyl methacrylate may be present in any suitable weight ratio. The weight ratio of acrylic acid:butyl methacrylate:butyl acrylate:methyl methacrylate may be 1:2 to 10:1 to 5:1 to 4, suitably 1:2 to 6:1 to 4:1 to 3, such as 1:3 to 5:2 to 4:1 to 3. Suitably, the weight ratio of acrylic acid:butyl methacrylate:butyl acrylate:methyl methacrylate may be 1:4:3:2.

Suitably, the emulsion polymerised acrylic latex material may comprise methacrylic acid. The emulsion polymerised acrylic latex material may comprise any suitable amount of methacrylic acid. The emulsion polymerised acrylic latex material may comprise from 1 to 50 wt %, such as from 5 to 40 wt %, such as from 5 to 30 wt %, such as from 10 to 30 wt %, or even from 10 to 20 wt % methacrylic acid based on the total weight of the monomers.

Suitably, the emulsion polymerised acrylic latex material may comprise acrylic acid. The emulsion polymerised acrylic latex material may comprise any suitable amount of acrylic acid. The emulsion polymerised acrylic latex material may comprise from 1 to 50 wt %, such as from 1 to 40 wt %, such as from 1 to 30 wt %, such as from 1 to 20 wt %, or even from 1 to 10 wt % methacrylic acid based on the total weight of the monomers.

The emulsion polymerised acrylic latex material comprises acrylic acid and/or methacrylic acid. Suitably, the emulsion polymerised acrylic latex material comprises acrylic acid and methacrylic acid. Suitably, the emulsion polymerised acrylic latex material comprises acrylic acid and methacrylic acid in the amounts defined herein.

The emulsion polymerised acrylic latex material may be formed from one or more additional ethylenically unsaturated monomer(s). Suitable additional ethylenically unsaturated monomer(s) are as described above in relation to the solution polymerised acrylic material.

The emulsion polymerised acrylic latex material may comprise an aqueous dispersion of said emulsion polymerised acrylic latex material.

The emulsion polymerised acrylic latex material is suitably formed by an emulsion polymerisation method. Suitable emulsion polymerisation methods will be well known to a person skilled in the art. The emulsion polymerisation method suitably comprises a plurality of components, which may be referred to as an emulsion polymerisation reaction mixture.

The emulsion polymerisation reaction mixture suitably comprises an emulsion polymerisation monomer component. The emulsion polymerisation monomer component suitably comprises one or more acrylic monomer(s) as described above. The emulsion polymerisation monomer component may optionally comprise additional ethylenically unsaturated monomers as described above. The emulsion polymerisation monomer component of the emulsion polymerisation reaction mixture may be the same or different to the solution polymerisation monomer component of the solution polymerisation reaction mixture. Suitably, the monomer component of the emulsion polymerisation reaction mixture may be different to the monomer component of the solution polymerisation reaction mixture.

Suitably, the emulsion polymerisation monomer component may be substantially hydrophobic. For example, the emulsion polymerisation monomer component may have a partition coefficient of at least 1 (one), suitably at least 1.25, such as at least 1.5, such as at least 2, or even at least 2.5. It will be appreciated by a person skilled in the art that it is the emulsion polymerisation monomer component overall and not each individual monomer present in the emulsion polymerisation monomer component that should have a partition coefficient of at least 1 (one). Advantageously, the use of an emulsion polymerisation monomer component having a partition coefficient of at least 1 (one), results in an emulsion polymerised acrylic latex material that displays lower agglomeration than would typically be expected. For example, a person skilled in the art will appreciate that this means that an emulsion polymerised acrylic latex material having reduced grit (i.e. agglomerated particles) may be formed.

The emulsion polymerisation reaction mixture may further comprise an initiator. Suitable initiators are as described above in relation to the solution polymerised acrylic material. Suitably, the initiator may comprise ammonium persulphate, hydrogen peroxide, benzoin or combinations thereof.

Suitably, the initiator may comprise ammonium persulphate, hydrogen peroxide and benzoin.

The emulsion polymerisation reaction mixture may comprise any suitable amount of ammonium persulphate. Suitably, the emulsion polymerisation reaction mixture may comprise from 0.01 to 1 wt %, such as from 0.05 to 0.75 wt %, such as from 0.1 to 0.5 wt %, or even from 0.1 to 0.25 wt % ammonium persulphate based on the total weight of the monomers.

Suitably, the emulsion polymerisation reaction mixture may comprise from 0.4 to 0.5 wt % ammonium persulphate based on the total weight of the monomers.

Suitably, the emulsion polymerisation reaction mixture may comprise from 0.15 to 0.25 wt %, such as from 0.18 to 0.22 wt %, such as 0.2 wt % ammonium persulphate based on the total weight of the monomers. Suitably, the emulsion polymerisation reaction mixture may comprise from 0.15 to 0.25 wt %, such as from 0.18 to 0.22 wt %, such as 0.2 wt % ammonium persulphate based on the total weight of the monomers, when the initiator comprises ammonium persulphate, hydrogen peroxide and benzoin.

The emulsion polymerisation reaction mixture suitably comprises water.

Suitably, the monomer component of the emulsion polymerisation reaction mixture is caused to undergo polymerisation in the water to form the emulsion polymerised acrylic latex material. Thus, the polymerisation of the monomer component of the emulsion polymerisation reaction mixture is typically carried out as a free radical initiated emulsion polymerisation in water. Suitably, the monomer component of the emulsion polymerisation reaction mixture forms an oil phase in the water.

The emulsion polymerisation reaction mixture may comprise a buffer. Suitable buffers will be well known to a person skilled in the art. Suitably, the buffer may be operable to act as a hydrogen ion acceptor. Examples of suitable buffers include, but are not limited to sodium bicarbonate.

The emulsion polymerisation reaction mixture may comprise a surfactant. The surfactant may be an anionic, cationic or non-ionic type stabilizer. Suitable examples of anionic surfactants include, but are not limited to, alkyl sulphates such as, for example, sodium dodecyl sulphate or sodium polyoxy ethylene alkyl ether sulphate; aryl sulphonates such as, for example, sodium dodecylbenzene sulphonate; sulphosuccinates such as, for example, sodium diisobutyl sulpho succinate, sodium dioctyl sulpho succinate and sodium di cyclohexyl sulpho succinate; and combinations thereof. Suitable examples of nonionic emulsifiers include, but are not limited to, fatty alcohol ethoxylates such as, for example polyethylene glycol mono lauryl ether; fatty acid ethoxylates such as, for example, polyethylene glycol mono stearate or polyethylene glycol mono laurate; polyether block polymers such as, for example, polyethylene glycol/polypropylene glycol block polymers also known as pluronics, typical commercial products of this type include Tergitol XJ, XH or XD commercially available from Dow Chemical; and combinations thereof. Suitable examples of cationic emulsifiers include, but are not limited to, amine salts such as, for example, cetyl trimethyl ammonium chloride or benzyl dodecyl dimethyl ammonium bromide; and combinations thereof. It will be appreciated by a person skilled in the art that mixtures of anionic and cationic emulsifiers would typically not be desirable.

Suitably, however, the emulsion polymerisation reaction mixture may be substantially free, may be essentially free or may be completely free of surfactant. By substantially free in relation to surfactants, is meant that the emulsion polymerisation reaction mixture comprises less than 5 wt % of surfactant based on the total weight of the emulsion polymerisation reaction mixture. By essentially free in relation to surfactants, is meant that the emulsion polymerisation reaction mixture comprises less than 1 wt % of surfactant based on the total weight of the emulsion polymerisation reaction mixture. By completely free in relation to surfactants, is meant that the emulsion polymerisation reaction mixture comprises less than 0.01 wt % of surfactant based on the total weight of the emulsion polymerisation reaction mixture. Suitably, emulsion polymerisation reaction mixture comprises no, i.e. 0 wt %, surfactant.

The surfactant may be polymeric. The surfactant may be polymerisable with the emulsion polymerised acrylic latex material. For example, the surfactant may be polymerisable with the monomers that form the emulsion polymerised acrylic latex material.

The emulsion polymerisation reaction mixture may comprise a neutraliser. Suitable neutralisers are as described above in relation to the solution polymerised acrylic material. Suitably, a neutraliser may be added to at least of portion of the emulsion polymerisation monomer component. Suitably, a neutraliser may be added to at least a portion of the emulsion polymerisation monomer component prior to the polymerisation reaction, i.e. prior to the emulsion polymerisation monomer component contacting the initiator.

Advantageously, it has been found by the present inventors that the emulsion polymerised acrylic latex material may be prepared in the absence of surfactants.

Emulsion polymerisation is typically carried out in a suitable reaction vessel. The emulsion polymerisation monomer component, initiator and/or water of the emulsion polymerisation reaction mixture may be added to the reaction vessel in any suitable order. For example, the water may be added to the reaction vessel before the emulsion polymerisation monomer component and/or initiator are added to the reaction vessel. Suitably, the initiator is added to the reaction vessel before the emulsion polymerisation monomer component. The emulsion polymerisation monomer component and/or initiator may be added to the reaction vessel over any suitable period of time. The emulsion polymerisation monomer component and/or initiator may be added to the reaction vessel over a time period of from 0 to 24 hours, suitably from 30 minutes to 12 hours, such as from 1 hour to 10 hours, such as from 2 hours to 10 hours, or even from 2 to 6 hours. Suitably, the emulsion polymerisation monomer component and/or initiator may be added to the reaction vessel over a time period of 3 to 5 hours. Suitably, the emulsion polymerisation monomer component and/or initiator may be added to the reaction vessel over a time period of 4 to 5 hours. For the avoidance of doubt, when the emulsion polymerisation monomer component and/or initiator are added over a time period of 0 hours, all of the emulsion polymerisation monomer component and/or initiator are added at the same time (i.e. in a single addition).

Suitably, the emulsion polymerisation monomer component may be added to the reaction vessel over a time period of 1 to 24 hours, suitably from 1 to 12 hours, such as from 2 to 10 hours, or even from 2 to 6 hours. Suitably, the emulsion polymerisation monomer component may be added to the reaction vessel over a time period of 4 to 5 hours.

Advantageously, adding the emulsion polymerisation monomer component over a time period of 1 to 24 hours, suitably from 1 to 12 hours, such as from 2 to 10 hours, or even from 2 to 6 hours, results in an emulsion polymerised acrylic latex material that displays lower agglomeration than would typically be expected. For example, a person skilled in the art will appreciate that this means that an emulsion polymerised acrylic latex material having reduced grit (i.e. agglomerated particles) may be formed.

The emulsion polymerisation monomer component may be added at any suitable rate during the time period for addition of the emulsion polymerisation monomer component. The emulsion polymerisation monomer component may be added at a constant rate or the emulsion polymerisation monomer component may be added at a variable rate during the time period for addition of the emulsion polymerisation monomer component. Suitably, the emulsion polymerisation monomer component may be added dropwise. By the term 'dropwise' and like terms as used herein is meant, unless specified otherwise, that the emulsion polymerisation monomer component is added at a rate of from 0.05 to 1.0 wt %/minute over a period of time, T, based on the total solid weight of the monomers in the emulsion polymerisation monomer component. Suitably, the emulsion polymerisation monomer component is added at a rate which results in a low level of free monomer in the emulsion polymerisation reaction mixture. Suitably, the emulsion polymerisation monomer component is added at a rate which reduces or substantially prevents the monomers of the emulsion polymerisation monomer component from being insoluble in the emulsion polymerisation reaction mixture. In other words, suitably, the emulsion polymerisation monomer component is added at a suitable rate such that the monomers of the emulsion polymerisation monomer component are and/or remain substantially dissolved in the emulsion polymerisation reaction mixture.

Advantageously, adding the emulsion polymerisation monomer component dropwise results in a low level of free monomer in the emulsion polymerisation reaction mixture such that the emulsion polymerisation reaction results in an emulsion polymerised acrylic latex material that displays lower agglomeration than would typically be expected. For example, a person skilled in the art will appreciate that this means that an emulsion polymerised acrylic latex material having reduced grit (i.e. agglomerated particles) may be formed.

The monomer component may be added at a variable rate during the time period for addition of the monomer component.

The emulsion polymerised acrylic latex material may be obtainable by a method comprising the steps of:
  i) adding an initiator to an aqueous carrier to form an aqueous initiator mixture;
  ii) adding a monomer component comprising one or more acrylic monomer(s) to the aqueous initiator mixture of step a) to form an aqueous dispersion; and iii) polymerising the aqueous dispersion to form an emulsion polymerised acrylic latex material, wherein the monomer component has a partition coefficient of at least 1.

The emulsion polymerised acrylic latex material may be obtainable by a method comprising the steps of:
i) adding an initiator to an aqueous carrier to form an aqueous initiator mixture;
ii) adding a monomer component comprising one or more acrylic monomer(s) to the aqueous initiator mixture of step a) to form an aqueous dispersion; and
iii) polymerising the aqueous dispersion to form an emulsion polymerised acrylic latex material,
wherein the monomer component is added to the aqueous initiator mixture of step a) over a time period, T, of 1 to 24 hours.

Thus, according to a sixth aspect of the present invention there is provided a coating composition, the coating composition comprising:
a) a solution polymerised acrylic material;
b) an emulsion polymerised acrylic latex material, wherein one or both of the solution polymerised acrylic material and the emulsion polymerised acrylic latex material have acid functionality; and
c) a crosslinker material operable to crosslink the acid functionality on the solution polymerised acrylic material and/or emulsion polymerised acrylic latex material,
wherein the emulsion polymerised acrylic latex material is obtainable by a method comprising the steps of:
i) adding an initiator to an aqueous carrier to form an aqueous initiator mixture;
ii) adding a monomer component comprising one or more acrylic monomer(s) to the aqueous initiator mixture of step a) to form an aqueous dispersion; and
iii) polymerising the aqueous dispersion to form an emulsion polymerised acrylic latex material, wherein the monomer component is added to the aqueous initiator mixture of step a) over a time period of 1 to 24 hours.

According to a seventh aspect of the present invention there is provided a method of forming an emulsion polymerised acrylic latex material, the method comprising the steps of:
a) adding an initiator to an aqueous carrier to form an aqueous initiator mixture;
b) adding a monomer component comprising one or more acrylic monomer(s) to the aqueous initiator mixture of step a) to form an aqueous dispersion; and
c) polymerising the aqueous dispersion to form an emulsion polymerised acrylic latex material,
wherein the monomer component is added to the aqueous initiator mixture of step a) over a time period of 1 to 24 hours.

Suitable features of the sixth and/or seventh aspects of the present invention areas defined above in relation to the first, second, third, fourth and/or fifth aspects of the present invention.

The time period, T, of the sixth and/or seventh aspects of the present invention is from 1 to 24 hours. Suitably, the time period, T, may be from 1 to 12 hours, such as from 2 to 10 hours, such as from 2 to 6 hours, or even from 4 to 5 hours. The time period, T, is at least 1 hour. Suitably, the time period, T, may be at least 2 hours, such as at least 4 hours. The time period, T, is up to 24 hours. Suitably, the time period, T, may be up to 12 hours, such as up to 10 hours, such as up to 6 hours, or even up to 5 hours. The time period, T, is from 1 to 24 hours. Suitably, the time period, T, may be from 1 to 12 hours, such as from 1 to 10 hours, such as from 1 to 6 hours, or even from 1 to 5 hours. Suitably, the time period, T, may be from 2 to 12 hours, such as from 2 to 10 hours, such as from 2 to 6 hours, or even from 2 to 5 hours. Suitably, the time period, T, may be from 4 to 12 hours, such as from 4 to 10 hours, such as from 4 to 6 hours, or even from 4 to 5 hours.

Suitably, the monomer component may be added at a variable rate during the time period for addition of the monomer component. Suitably, the monomer component may be added at a slower rate initially and then at an increasingly faster rate during the time period for addition of the monomer component. For example, the monomer component may initially be added at a rate of from 0.05 to 0.50 wt %/minute, suitably from 0.1 to 0.25 wt %/minute, such as from 0.1 to 0.2 wt %/minute, or even from 0.15 to 0.2 wt %/minute based on the total solid weight of the monomers in the monomer component. The monomer component may subsequently be added at a rate of from 0.1 to 1 wt %/minute, suitably from 0.2 to 0.5 wt %/minute, such as from 0.2 to 0.4 wt %/minute, or even from 0.3 to 0.4 wt %/minute based on the total solid weight of the monomers in the monomer component. The monomer component may subsequently be added at a rate of from 0.2 to 2 wt %/minute, suitably from 0.4 to 1.0 wt %/minute, such as from 0.4 to 0.8 wt %/minute, or even from 0.5 to 0.8 wt %/minute based on the total solid weight of the monomers in the monomer component. For example, the monomer component may initially be added at a rate of from 0.05 to 0.50 wt %/minute, suitably from 0.1 to 0.25 wt %/minute, such as from 0.1 to 0.2 wt %/minute, or even from 0.15 to 0.2 wt %/minute based on the total solid weight of the monomers in the monomer component for a time period from 1 minute to 3 hours, suitably from 15 minutes to 2 hours, such as from 30 minutes to 90 minutes, or even for a time period of 1 hour. The monomer component may subsequently be added at a rate of from 0.1 to 1 wt %/minute, suitably from 0.2 to 0.5 wt %/minute, such as from 0.2 to 0.4 wt %/minute, or even from 0.3 to 0.4 wt %/minute based on the total solid weight of the monomers in the monomer component for a time period from 1 minute to 3 hours, suitably from 15 minutes to 2 hours, such as from 30 minutes to 90 minutes, or even for a time period of 1 hour. The monomer component may subsequently be added at a rate of from 0.2 to 2 wt %/minute, suitably from 0.4 to 1.0 wt %/minute, such as from 0.4 to 0.8 wt %/minute, or even from 0.5 to 0.8 wt %/minute based on the total solid weight of the monomers in the monomer component for a time period from 1 minutes to 6 hours, suitably from 30 minutes to 4 hours, such as from 1 hour to 3 hours, or even for a time period of 2 hours.

Emulsion polymerisation may be carried out at any suitable temperature. Emulsion polymerisation may be carried out at a temperature from 20° C. to 150° C., suitably from 40 to 120° C., such as from 50 to 100° C., such as from 60 to 95° C., or even from 70 to 90° C. Suitably, emulsion polymerisation may be carried out at a temperature of 80° C. The temperature is typically held constant throughout the emulsion polymerisation process.

The emulsion polymerised acrylic latex material suitably comprises pendant acid groups such that the emulsion polymerised acrylic latex material is acid-functional. The acid groups of the acid-functional emulsion polymerised acrylic latex material may be at least partially neutralised. The acid groups of the acid-functional emulsion polymerised acrylic latex material may be at least partially neutralised by contacting said acid-functional emulsion polymerised acrylic latex material with a neutraliser. Thus, suitably, the emulsion polymerised acrylic latex material may comprise a neutraliser. Suitable neutralisers are as described above in relation to the solution polymerised acrylic material. Suitably, the neutraliser may comprise a tertiary amine. Suitably, the neutraliser may comprise dimethylethanolamine (DMEA).

Any suitable amount of neutraliser may be added to the acid-functional emulsion polymerised acrylic latex material. The acid-functional emulsion polymerised acrylic latex material may be at least 10% neutralised, suitably at least 20% neutralised, such as at least 30% neutralised, such as at least 40%, or even at least 50% neutralised with the neutraliser. By, for example, 'at least 20% neutralised' is meant that at least 20% of the available acid groups of the acid-functional emulsion polymerised acrylic latex material are neutralised. A person skilled in the art will therefore appreciate that at least 30%, at least 40%, at least 50% neutralised etc. means that at least 30%, at least 40%, at least 50% of the available acid groups of the acid-functional emulsion polymerised acrylic latex material are neutralised. Suitably, the acid-functional emulsion polymerised acrylic latex material may be 50% neutralised with the neutraliser. For example, at least 0.2, suitably at least 0.3, such as at least 0.4, or even at least 0.5 equivalents of neutraliser may be added to the emulsion polymerised acrylic latex material per equivalent of acid groups.

The emulsion polymerised acrylic latex material may be in a core/shell arrangement.

The shell may be formed from a plurality of components, which may be referred to as a shell mixture. The shell mixture suitably comprises one or more acrylic monomer(s) as described above. The emulsion polymerisation reaction mixture may optionally comprise additional ethylenically unsaturated monomers as described above.

The shell mixture may further comprise one or more initiator(s). Suitable initiators are as described above in relation to the solution polymerised acrylic material.

Suitably, the shell mixture is caused to undergo polymerisation to form a shell polymer. The polymerisation of the shell mixture is typically carried out as a free radical initiated solution polymerisation in a solvent or mixture of solvents. The solvents which may be used in this process include, but are not limited to, alcohols such as n-butanol, pentanol or hexanol; or glycol ethers such as 2-butoxy ethanol, 1-methoxy propan-2-ol or dipropylene glycol mono methyl ether. Polymerisation may be carried out at an elevated temperature. Typically the polymerisation may be carried out in the range 80° C. to 150° C. The polymerisation can be effectively carried out by adding the shell mixture, over a set time period, to the solvent mixture. The shell mixture may be caused to undergo polymerisation to form a shell polymer prior to contact with components of the core mixture.

Where the shell mixture comprises one or more α,β-ethylenically unsaturated carboxylic acid, the shell polymer will have pendant carboxylic acid functional groups. This may be referred to a carboxylic acid functional shell polymer.

The carboxylic acid functional shell polymer may be contacted with a base to form a water dispersible salt. The carboxylic acid functionality in the carboxylic acid functional shell polymer may be at least partly neutralised with the base. Typically at least 10% of the available carboxylic acid groups are neutralised. Suitably, substantially all of the available carboxylic acid groups are neutralised by the base. Suitably, the base used for this neutralisation comprises an amine functional material, or a mixture of amine functional materials. Examples of suitable amine functional materials include ammonia, triethylamine, diethylamine, trimethylamine and morpholine or hydroxy amine materials such as ethanol amine, N-methyl ethanol amine and N,N di methyl ethanolamine.

The shell polymer may be dispersed in aqueous medium. In this manner, an aqueous dispersion or solution of the shell polymer may be formed.

The shell mixture may be caused to undergo polymerisation to form a shell polymer by emulsion polymerisation in an aqueous medium, thereby forming an aqueous dispersion or solution of the shell polymer.

The core may be formed from plurality of components, which may be referred to as a core mixture. Suitably, the core mixture comprises one or more acrylic monomer(s) as described above. The emulsion polymerisation reaction mixture may optionally comprise additional ethylenically unsaturated monomers as described above.

The polymer formed from the shell mixture, such as an aqueous dispersion thereof, may serve as a dispersant for a subsequent polymerisation, which may be a polymerisation of an α,β-ethylenically unsaturated monomer mixture, such as the core mixture.

The core mixture may further comprise one or more one or more initiator(s). Suitable initiators are as described above in relation to the solution polymerised acrylic material.

The core mixture may be caused to undergo polymerisation at a temperature in the range from 30° C. to 99° C., suitably in the range from 50° C. to 95° C., such as in the range from about 80° C. to 90° C. Polymerisation of the core mixture may occur in the presence of the polymer formed by polymerisation of the shell mixture to thereby form a core/shell polymer, typically by emulsion polymerisation. A typical polymerisation may be carried out by adding the core mixture, at a controlled rate over a period of time, to an aqueous dispersion of shell polymer. During the polymerisation the mixture may be mixed, such as by stirring and the temperature may be held generally constant.

Other methods to polymerise the core mixture include, but are not limited to, mixing all or part of the core ethylenically unsaturated substances with the aqueous dispersion of shell polymer and then adding the remaining core components, including initiator, to the resulting mixture over a set period of time. Suitable temperatures for this type of process are typically in the range 50° C. to 95° C.

For the core/shell latex composition the ratio of the core mixture (monomers and initiator) to shell mixture (monomers and initiator) may be from about 20:80 to 90:10 by weight. The ratio of the core mixture to shell mixture may be from about 60:40 to 80:20 by weight, suitably the ratio of the core mixture to shell mixture components may be from about 70:30 to 75:25.

The emulsion polymerised acrylic latex material may have any suitable glass transition temperature (Tg). The emulsion polymerised acrylic latex material may have a Tg from 0 to 100° C., such as from 10 to 100° C., such as from 10 to 75° C., such as from 10 to 50° C., such as from 15 to 50° C.

A person skilled in the art will appreciate that techniques to measure the glass transition temperature of the solution polymerised acrylic material, as defined above, may also be applied to measure the emulsion polymerised acrylic latex material.

The coating composition of the present invention comprises a crosslinker material. The crosslinker material is operable to crosslink acid functionality on the solution polymerised acrylic material and/or emulsion polymerised acrylic latex material.

Suitable crosslinker materials operable to crosslink acid functionality on the solution polymerised acrylic material and/or emulsion polymerised acrylic latex material will be well known to the person skilled in the art. Suitable crosslinker materials include, but are not limited to, one or more of the following: phenolic resins (or phenol-formaldehyde resins); aminoplast resins (or triazine-formaldehyde resins); amino resins; epoxy resins; epoxy-mimic resins, such as those based on bisphenols and other bisphenol A (BPA) replacements; isocyanate resins, isocyanurate resins, such as triglycidylisocyanurate; hydroxy (alkyl) amide resins, such as β-hydroxy (alkyl) amide resins; hydroxy(alkyl) urea resins; carbodiimide resins; oxazolines; and combinations thereof.

Non-limiting examples of phenolic resins are those formed from the reaction of a phenol with an aldehyde or a ketone, suitably from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Cytec Industries, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Momentive, such as BAKELITE 6582 LB, BAKELITE 6535, BAKELITE PF9989 or BAKELITE PF6581; SFC 112 commercially available from Schenectady; DUREZ® 33356 commercially available from SHHPP; ARALINK® 40-852 commercially available from Bitrez; or combinations thereof.

The crosslinker material may be selected from phenolic resins; hydroxy (alkyl) amide resins, such as β-hydroxy (alkyl) amide resins; hydroxy(alkyl) urea resins; carbodiimide resins, such as polycarbodiimide resins; oxazolines; isocyanurate resins, such as triglycidylisocyanurate; oxazolines; epoxy-mimic resins, such as those based on bisphenols and other bisphenol A (BPA) replacements; or combinations thereof.

The crosslinker material may be selected from hydroxy (alkyl) amide resins, such as β-hydroxy (alkyl) amide resins; phenolic resins, hydroxy(alkyl) urea resins; carbodiimide resins, such as polycarbodiimide resins; oxazolines; isocyanurate resins, such as triglycidylisocyanurate; oxazolines; epoxy-mimic resins, such as those based on bisphenols and other bisphenol A (BPA) replacements; or combinations thereof.

Suitably, the crosslinker material may comprise a phenolic resin, such as a resole phenolic resin.

Suitably, the crosslinker material may be selected from phenolic resins, hydroxy (alkyl) amide resins, such as β-hydroxy (alkyl) amide resins, hydroxy(alkyl) urea resins, carbodiimide resins, oxazolines or combinations thereof. Suitably, the crosslinker material may be selected from hydroxy (alkyl) amide resins, such as β-hydroxy (alkyl) amide resins, hydroxy(alkyl) urea resins, carbodiimide resins, oxazolines or combinations thereof. Suitably, the crosslinker material may be selected from hydroxy (alkyl) amide resins, such as β-hydroxy (alkyl) amide resins and/or hydroxy(alkyl) urea resins.

Suitably, the crosslinker material may comprise a hydroxyalkylamide material and/or a hydroxyalkylurea material and/or a carbodiimide resin. Suitably, the crosslinker material may comprise a hydroxyalkylamide material and/or a hydroxyalkylurea material.

Suitably, the crosslinking material may comprise a hydroxyalkylamide material and a phenolic resin, such as a hydroxyalkylamide material and a resole phenolic resin, such as a β-hydroxyalkylamide material and a resole phenolic resin.

Suitably, the crosslinker material contains nitrogen, which may be in the form of an amine or amide material. The crosslinker material may comprise a hydroxyl substituted amine or amide material.

Suitably, the crosslinker material comprises a hydroxyalkylamide material, such as a β-hydroxyalkylamide material.

The crosslinker material may contain a terminal chemical group as shown in Formula I.

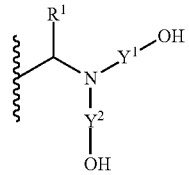

Formula I wherein $R^1$ represents an electron withdrawing group, such as (=O); and $Y^1$ and $Y^2$ each, independently, represents a $C_1$ to $C_3$ alkylene group.

The terminal chemical group of Formula I may be connected to a further chemical structure, not shown. Additionally or alternatively, the chemical group of Formula I may be suspended from a carrier substrate, such as a silica carrier substrate, for example.

The hydroxyalkylamide crosslinker may contain a plurality of terminal chemical groups as shown in Formula I. For example, the hydroxyalkylamide crosslinker may contain 2, 3 or 4 terminal chemical groups as shown in Formula I.

The hydroxyalkylamide crosslinker may comprise a moiety according to Formula II:

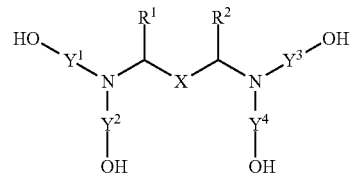

Formula II wherein $R^1$ and $R^2$ with reference to Formula II each, independently, represent an electron withdrawing group, such as (=O); $Y^1$, $Y^2$, $Y^3$ and $Y^4$ with reference to Formula II each, independently, represent a $C_1$ to $C_3$ alkylene group; and X is a $C_2$ to $C_6$ alkylene group.

Suitably, each of $R^1$ and $R^2$ with reference to Formula II represents a (=O) group.

Suitably, each of $Y^1$, $Y^2$, $Y^3$ and $Y^4$ with reference to Formula II represent an ethylene group.

Suitably, X represents a butylene group.

Accordingly, the hydroxyalkylamide crosslinker comprises a material of formula III:

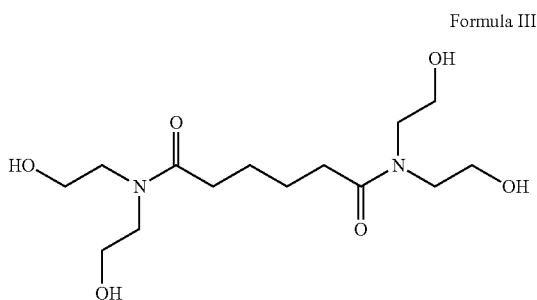 [SMILES: O=C(CCCCC(=O)N(CCO)CCO)N(CCO)CCO]

Formula III

The coating composition of the present invention may comprise a commercially available hydroxyalkylamide crosslinker such as, for example, PRIMID XL-552 (available from EMS Chemie); PRIMID QM-1260 (available from EMS Chemie); PRIMID SF-4510 (available from EMS Chemie) and N,N,N',N'-tetrakis(2-hydroxypropyl)adipamide.

The hydroxyalkylamide crosslinker may comprise a polyhydroxyalkylamide material having the formula (IV):

formula (IV)

wherein, with reference to formula (IV), Z represents a polymer or an alkylene, alkenylene, alkynylene or arylene group;
Z' represents a bivalent organic linking group;
m is 0 or 1;
X represents a bivalent organic bridging group;
R represents a hydroxyalkylamide group; and
n is at least 2

Z with reference to formula (IV) represents a polymer or an alkylene, alkenylene, alkynylene or arylene group.

Z with reference to formula (IV) may represent a polymer. Z with reference to formula (IV) may represent any suitable polymer. Suitable polymers include, but are not limited to, acrylic polymers, polyester polymers, polyester amide polymers, polyurethane polymers, epoxy polymers, and combinations thereof. Z with reference to formula (IV) may represent an acrylic polymer, a polyester polymer or a combination thereof. Z with reference to formula (IV) may represent an acrylic polymer grafted to a polyester or a polyester grafted to an acrylic polymer.

Z with reference to formula (IV) may represent an acrylic polymer. Z with reference to formula (IV) may represent an acrylic polymer derived from monomers having ethylenic unsaturation.

By "derived from", and like terms, in this context is meant that the monomers from which the acrylic polymer is formed have ethylenic unsaturation when in the monomeric form. Typically, the monomers having ethylenic unsaturation are caused to polymerise via said ethylenic unsaturation, such as for example by a free radical reaction, such that the so-formed acrylic polymer has a substantially, essentially or completely saturated backbone. However, this does not exclude the possibility of the acrylic polymer having ethylenic unsaturation either in the backbone or the sidechains thereof.

The acrylic polymer may be derived from any suitable monomer(s) having ethylenic unsaturation. The acrylic polymer may be derived from one or more acrylic monomer(s). Suitable acrylic monomers will be well known to a person skilled in the art. Suitable acrylic monomers include, but are not limited to, alkyl (alk)acrylate, such as $C_1$ to $C_6$ alkyl ($C_1$ to $C_6$ alk)acrylate, for example, $C_1$ to $C_6$ alkyl (meth)acrylate, and (alk)acrylic acid, such as ($C_1$ to $C_6$ alk)acrylic acid. The acrylic monomers from which the acrylic polymer derives may comprise one or more functional group, such as an epoxy group. For example, the acrylic monomers from which the acrylic polymer derives may comprise glycidyl methacrylate.

The terms "(alk)acrykate", "(meth)acrylate" and like terms as used herein are used conventionally and herein to refer to both alkacrylate and acrylate, such as methacrylate and acrylate.

Examples of suitable acrylic monomers include, but are not limited to, acrylic acid, methacrylic acid, methyl acrylate; methyl methacrylate; ethyl acrylate; ethyl methacrylate; propyl acrylate; propyl methacrylate; butyl acrylate; butyl methacrylate, isobornyl acrylate, isobornyl methacrylate, hydroxyethyl acrylate, hydroxyethyl methacrylate, 2-ethylhexyl acrylate, 2-ethylhexyl methacrylate, glycidyl acrylate; glycidyl methacrylate; ethylene glycol diacrylate; ethylene glycol dimethacrylate; 1,6-hexanediol diacrylate; 1,6-hexanediol dimethacrylate; 4-hydroxybutyl acrylate; 4-hydroxybutyl methacrylate; allyl methacrylate; benzyl methacrylate; phosphate esters of 2-hydroxyethyl methacrylate; those sold under the trade name SIPOMER such as SIPOMER PAM-100, SIPOMER PAM-200 and SIPOMER PAM-300 (phosphate esters of polypropylene glycol monoacrylate commercially available from Solvay); and combinations thereof. Any other acrylic monomers known to those skilled in the art could also be used.

The monomers having ethylenic unsaturation may comprise glycidyl acrylate, glycidyl methacrylate or combinations thereof.

The monomers having ethylenic unsaturation may comprise glycidyl methacrylate.

The monomers having ethylenic unsaturation may comprise glycidyl methacrylate, butyl methacrylate, methyl methacrylate, butyl acrylate, hydroxylethyl methacrylate and combinations thereof.

Therefore, the acrylic polymer may be derived from monomers comprising glycidyl acrylate, glycidyl methacrylate or combinations thereof.

The acrylic polymer may be derived from monomers comprising glycidyl methacrylate.

The acrylic polymer may be derived from monomers comprising glycidyl methacrylate, butyl methacrylate, methyl methacrylate, butyl acrylate, hydroxyethyl methacrylate and combinations thereof.

Z', when present, and with reference to formula (IV) represents a bivalent organic linking group. Z' with reference to formula (IV) may represent any suitable bivalent organic linking group.

Z' with reference to formula (IV) may represent a $C_1$ to $C_{10}$ alkylene, alkenylene, alkynylene, aralkylene or arylene group, such as a $C_1$ to $C_{10}$ alkylene group, such as a $C_1$ to $C_6$ alkylene group, such as a $C_1$ to $C_4$ alkylene group, such as a $C_2$ to $C_4$ alkylene group, such as a $C_3$ to $C_4$ alkylene group, such as $C_4$ alkylene group.

Z' with reference to formula (IV) may be substituted or unsubstituted. Z' with reference to formula (IV) may be substituted. Z' with reference to formula (IV) may be substituted with any suitable group. Z' with reference to formula (IV) may be substituted with $OR^5$, $OC(O)R^6$, $C(O)R^7$, $C(O)OR^8$, $NR^9R^{10}$, $C(O)NR^{11}R^{12}$, aryl or Het, wherein $R^5$ to $R^{12}$ each independently represents hydrogen, aryl or alkyl, such as hydrogen, $C_6$ to $C_{10}$ aryl or $C_1$ to $C_{10}$ alkyl, such as hydrogen, $C_6$ aryl or $C_1$ to $C_4$ alkyl. Z' with reference to formula (IV) may be substituted with one or more $OR^5$ group(s), wherein each $R^5$ independently represents hydrogen, aryl or alkyl, such as hydrogen or alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl, such as hydrogen. Z' with reference to formula (IV) may be interrupted or uninterrupted. Z' with reference to (IV) may be interrupted. Z' with reference to (IV) may be interrupted by any suitable atom. Z' with reference to (IV) may be interrupted an oxygen atom and/or a carbonyl group.

Z' with reference to (IV) may be substituted by an oxygen atom and a carbonyl group. Z' with reference to (IV) may be substituted by an oxygen atom and a carbonyl group. Z' with reference to (IV) may be substituted by an oxygen atom and a carbonyl group.

m with reference to (IV) may be 0 or 1.

With reference to (IV), when Z represents an alkylene, alkenylene, alkynylene or arylene group, m may be 0. It will be appreciated by a person skilled in the art that when m is 0, Z may be directly attached to, i.e. directly bonded to, —OC(═O)—X—R.

With reference to (IV), when Z is a polymer, m may be 1. With reference to (IV), when Z is an acrylic polymer derived from monomers having ethylenic unsaturation, m may be 1.

With reference to (IV), m may be 1 and Z' may be substituted by an oxygen atom and a carbonyl group such that the polyhydroxyalkylamide material may be represented by the formula (V):

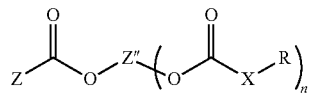

formula (V)

wherein, with reference to formula (V), X and n are each as defined herein in relation to formula (IV);
Z represents an acrylic polymer derived from monomers having ethylenic unsaturation; and
Z" represents an alkylene, alkenylene, alkynylene, aralkylene or arylene group.

Z" with reference to formula (V) may represent a $C_1$ to $C_{10}$ alkylene, alkenylene, alkynylene, aralkylene or arylene group, such as a $C_1$ to $C_{10}$ alkylene group, such as a $C_1$ to $C_6$ alkylene group, such as $C_1$ to $C_4$ alkylene group, such as a $C_1$ to $C_3$ alkylene group, such as a $C_2$ to $C_3$ alkylene group, such as a $C_3$ alkylene group. Z" with reference to formula (V) may be substituted or unsubstituted. Z" with reference to formula (V) may be substituted. Z" with reference to formula (V) may be substituted with any suitable group. Suitable groups are as defined herein in relation to Z' of formula (IV). Z" with reference to formula (V) may be substituted with one or more $OR^5$ group(s), wherein each $R^5$ independently represents hydrogen, aryl or alkyl, such as hydrogen or alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl, such as hydrogen.

Z" with reference to formula (V) may be a $C_3$ alkylene group. Z" with reference to formula (V) may be a $C_3$ alkylene group and may be substituted with an —OR' group, wherein R is defined as herein. Z" with reference to formula (V) may be a $C_3$ alkylene group and may be substituted with an —$OR^5$ group, wherein $R^5$ is defined as herein, such that the polyhydroxyalkylamide may be represented by the formula (VI):

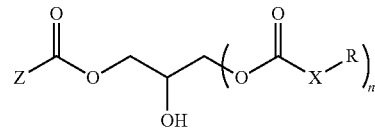

formula (VI)

wherein, with reference to formula (VI), X and R are each as defined herein in relation to formula (IV); and
Z represents an acrylic polymer derived from monomers having ethylenic unsaturation.

Z with reference to formula (IV) may represent an alkylene, alkenylene, alkynylene or arylene group. Z with reference to formula (IV) may represent a $C_1$ to $C_{20}$ alkylene, alkenylene, alkynylene or arylene group, such as a $C_1$ to $C_{20}$ alkylene group, such as a $C_6$ to $C_{20}$ alkylene group, such as a $C_6$ to $C_{20}$ cyclic alkylene group, such as a $C_8$ to $C_{18}$ cyclic alkylene group, such as a $C_{10}$ to $C_{16}$ cyclic alkylene group. Z with reference to formula (IV) may be substituted or unsubstituted. Z with reference to formula (IV) may be substituted. Z with reference to formula (IV) may be substituted with any suitable group. Suitable groups are as defined herein in relation to Z'. Z with reference to formula (IV) may be substituted with an $OR^5$ group, wherein each $R^5$ independently represents hydrogen, aryl or alkyl, such as hydrogen or alkyl, such as hydrogen or $C_1$ to $C_6$ alkyl, such as hydrogen or $C_1$ to $C_4$ alkyl, such as hydrogen or $C_1$ to $C_2$ alkyl, such as hydrogen or methyl, such as hydrogen. Z with reference to formula (IV) may be interrupted or uninterrupted. Z with reference to formula (IV) may be interrupted. Z with reference to formula (IV) may be interrupted by any suitable atom. Z with reference to formula (IV) may be interrupted an oxygen atom and/or a carbonyl group, such as by an oxygen atom and a carbonyl group.

Z with reference to formula (IV) may not be interrupted by a nitrogen atom. Z with reference to formula (IV) may not contain an amide group.

Z with reference to formula (IV) may be derived from a material having one or more epoxy group(s). By "derived from", and like terms, in this context is meant that the material from which Z is derived has one or more epoxy group(s) in its free-form, i.e. before it is formed into the polyhydroxyalkylamide material. It will be appreciated by a person skilled in the art that when Z is derived from material having one or more epoxy group(s), said epoxy group(s) may or may not be present in the final polyhydroxyalkylamide material. For example, the one or more epoxy group(s) may be reacted during the formation of the polyhydroxyalkylamide material. For example, the one or more epoxy group(s) may be reacted with an acid group during the formation of the polyhydroxyalkylamide material.

Z with reference to formula (IV) may be derived from a polymer having at least two epoxy groups. Z with reference to formula (IV) may be derived from an acrylic polymer having at least two epoxy groups. With reference to formula (IV), when Z is derived from a polymer having at least two epoxy groups, Z may suitably be formed from one or more monomer(s) comprising an epoxy group. With reference to formula (IV), when Z is derived from a polymer having at least two epoxy groups, Z may comprise from 5 to 80 wt % of monomers having an epoxy group, such as from 10 to 70 wt % of monomers having an epoxy group, such as from 10 to 60 wt % of monomers having an epoxy group.

With reference to formula (IV), when Z is derived from an acrylic polymer having at least two epoxy groups, Z may be derived from an acrylic polymer formed from monomers comprising one or more glycidyl group(s), such as glycidyl methacrylate.

Z with reference to formula (IV) may be derived from a diepoxide. Z with reference to formula (IV) may be derived from any suitable diepoxide. Z with reference to formula (IV) may be derived from an aliphatic diepoxide, such as a cycloaliphatic diepoxide such as from a $C_4$ to $C_{20}$ cycloaliphatic diepoxide, such as from a $C_6$ to $C_{20}$ cycloaliphatic diepoxide. Z with reference to formula (IV) may be derived from (3',4'-epoxycyclohexane)methyl 3,4-epoxycyclohexyl-carboxylate.

With reference to formula (IV), when Z is derived from a diepoxide, the diepoxide may be a commercially available diepoxide. The diepoxide may be any suitable commercially available diepoxide. Suitable commercially available diepoxides include, for example, those sold under the trade name CELLOXIDE®, such as CELLOXIDE 2021P (commercially available from DAICEL U.S.A.).

X with reference to formula (IV) represents a bivalent organic bridging group. X with reference to formula (IV) may represent any suitable bivalent organic bridging group. X with reference to formula (IV) may represent an alkylene, alkenylene, alkynylene, aralkylene or arylene group, such as a $C_0$ to $C_{10}$ alkylene, alkenylene, alkynylene, aralkylene or arylene group, such as a $C_0$ to $C_{10}$ alkylene or arylene group, such as a $C_0$ to $C_6$ alkylene or arylene group, such as a $C_1$ to $C_6$ alkylene or arylene group, such as a $C_1$ to $C_6$ alkylene group, such as a $C_1$ to $C_4$ alkylene group, such as a $C_1$ to $C_3$ alkylene group, such as a $C_1$ to $C_2$ alkylene group, such as ethylene. It will be appreciated by a person skilled in the art that when X with reference to formula (IV) is $C_0$, no linking group is present and there is a direct bond between the carbon atom of Z—O—C(=O)— and —R of formula (IV).

R with reference to formula (IV) represents a hydroxyalkylamide group. R with reference to formula (IV) may represent any suitable hydroxyalkylamide group. R with reference to formula (IV) may be according to formula (VII):

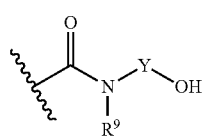

formula (VII)

wherein, with reference to formula (VII), $R^9$ represents hydrogen, an alkyl, alkenyl, alkynyl or aryl group, or —Y—OH; and each Y independently represents an alkylene, alkenylene, alkynylene or arylene linking group.

It will be appreciated by a person skilled in the art that when R with reference to formula (IV) is according to formula (VII), the polyhydroxyalkylamide material may be represented by the formula (VIII):

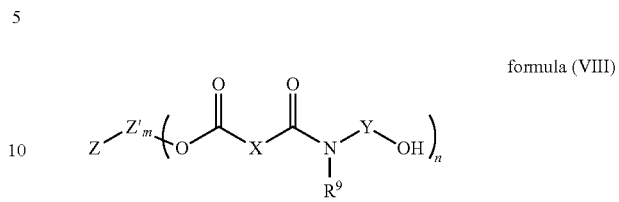

formula (VIII)

wherein, with reference to formula (VIII), Z, Z', X, $R^9$, m and n are each as defined herein in relation to formulae (IV) and (VII).

With reference to formula (VIII), $R^9$ may represent hydrogen, an alkyl group or —Y—OH, wherein each Y independently represents an alkylene linking group. With reference to formula (VIII), $R^9$ may represent hydrogen, a $C_1$ to $C_{10}$ alkyl group or —Y—OH wherein each Y independently represents a $C_1$ to $C_{10}$ alkylene linking group. With reference to formula (VIII), $R^9$ may represent hydrogen, a $C_1$ to $C_3$ alkyl group or —Y—OH wherein each Y independently represents a $C_1$ to $C_3$ alkylene linking group. With reference to formula (VIII), $R^9$ may represent hydrogen, a $C_1$ to $C_2$ alkyl group or —Y—OH wherein each Y independently represents a $C_1$ to $C_2$ alkylene linking group. With reference to formula (VIII), $R^9$ may represent hydrogen, a $C_1$ to $C_2$ alkyl group or —$CH_2CH_2$—OH. With reference to formula (VIII), $R^9$ may represent hydrogen, methyl or ethyl. With reference to formula (VIII), $R^9$ may represent hydrogen or methyl.

Y with reference to formula (VIII) may represent ethylene.

With reference to formula (VIII), $R^9$ may be hydrogen or methyl and Y may be ethylene. With reference to formula (VIII), $R^9$ may be methyl and Y may be ethylene.

Thus, R with reference to formula (IV) may be according to formula (IX):

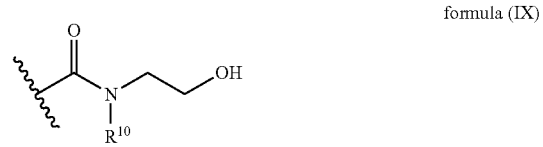

formula (IX)

wherein, with reference to formula (IX), $R^{10}$ represents hydrogen or methyl.

With reference to formula (VIII), when $R^9$ is a methyl group and X is an alkylene group, $R^9$ may together with one or more atom(s) of X form a cyclic group such that the polyhydroxyalkylamide material may be represented by the formula (X):

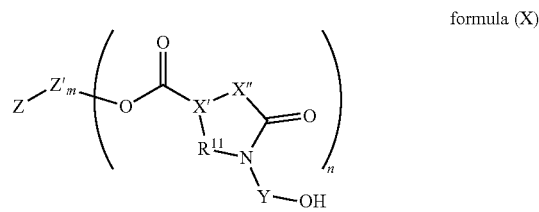

formula (X)

wherein, with reference to formula (X), Z, Z', m and n are each as defined herein in relation to formula (IV);

$R^{11}$ is the bivalent radical of $R^9$ and represents a methylene group;

X' is a fragment of X and represents —$CR^{11}$—, wherein $R^{11}$ represents hydrogen or a $C_1$ to $C_9$ alkyl group, such as hydrogen or a $C_1$ to $C_4$ alkyl group, such as hydrogen or a $C_1$ to $C_2$ alkyl group, such as hydrogen or methyl, such as hydrogen; and X" is the remaining fragment of X and represents a $C_0$ to $C_8$ alkylene group, such as a $C_1$ to $C_8$ alkylene group, such as a $C_1$ to $C_4$ alkylene group, such as a $C_1$ to $C_2$ alkylene group, such as a $C_1$ alkylene group.

With reference to formula (X), it will be appreciated that when X" is a $C_0$ alkylene group, the so formed cyclic group will be an N-substituted β-lactam group and when X" is a $C_1$ alkylene group, the so formed cyclic group will be an N-substituted γ-lactam group, etc.

The polyhydroxyalkylamide material may be represented by the formula (XI):

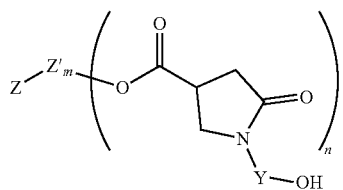

formula (XI)

wherein, with reference to formula (XI), Z, Z', Y, m and n are each as defined herein in relation to formula (IV).

Y with reference to formula (XI) may be ethylene.

R with reference to formula (IV) may comprise at least one amide group.

R with reference to formula (IV) may comprise one amide group.

R with reference to formula (IV) may comprise at least two amide groups, such as two, three, four, five, six etc. amide groups. For example, the polyhydroxyalkylamide material may be represented by the formula (XII):

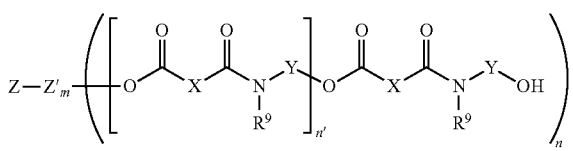

formula (XII)

wherein, with reference to formula XII, Z, Z' X, Y, $R^9$, m and n are each as defined herein in relation to formulae (IV) and/or (VII); and n' is at least 1.

For example, the polyhydroxyalkylamide may be represented by the formula (XIII):

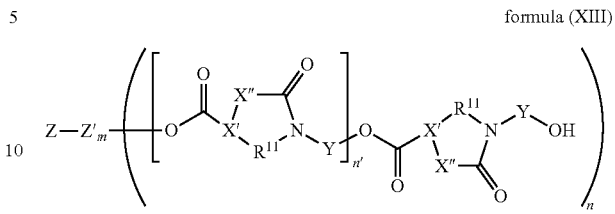

formula (XIII)

wherein, with reference to formula XIII, Z, Z', X', X", Y, $R^{11}$, m and n are each as defined herein in relation to formulae (IV), (VII) and/or (X); and n' is at least 1.

n' with reference to formula (XIII) is at least 1. n' with reference to formula (XIII) may be from 1 to 30, such as from 1 to 20, such as from 1 to 10, such as from 1 to 5, such as 1, 2, 3, 4 or 5.

n with reference to formula (IV) is at least 2. With reference to formula (IV), when Z is a $C_1$ to $C_{20}$ alkylene, alkenylene, alkynylene or arylene group, n may be 2. With reference to formula (IV), when Z is a polymer, such as an acrylic polymer or even an acrylic polymer derived from monomers having ethylenic unsaturation, n may be at least 2.

The polyhydroxyalkylamide materials according to formula (IV) may have any suitable number of bridging atoms between the hydroxyalkylamide groups, R, of the polyhydroxyalkylamide materials. The polyhydroxyalkylamide material according to formula (IV) may have at least 6 bridging atoms, such as at least 8 bridging atoms, such as at least 10 bridging atoms, such as at least 15 bridging atoms, such as at least 18 bridging atoms, such as at least 20 bridging atoms, such as at least 30 bridging atoms, such as at least 40 bridging atoms, or even at least 50 bridging atoms between the hydroxyalkylamide groups, R. For the avoidance of doubt, by "bridging atoms between the hydroxyalkylamide groups", and like terms a used herein, is meant the number of atoms in the chain of atoms directly connecting two R groups (i.e. —C(=O)N($R^9$)(YOH) groups, for example) and is not intended to include any atoms branched therefrom. For example, a polyhydroxyalkylamide material according to formula (XIII) below has 19 (nineteen) bridging atoms between the hydroxyalkylamide groups.

The polyhydroxyalkylamide material may be according to formula (XIV):

formula (XIV)

wherein, with reference to formula (XIV), Z represents an acrylic polymer derived from monomers having ethylenic unsaturation; and n is at least 2.

The polyhydroxyalkylamide material may be according to formula (XV):

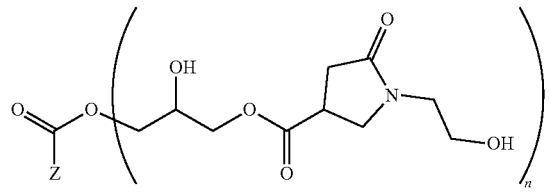

formula (XV)

wherein, with reference to formula (XV), Z represents an acrylic polymer derived from monomers having ethylenic unsaturation; and n is at least 2.

The polyhydroxyalkylamide material may be according to formula (XVI):

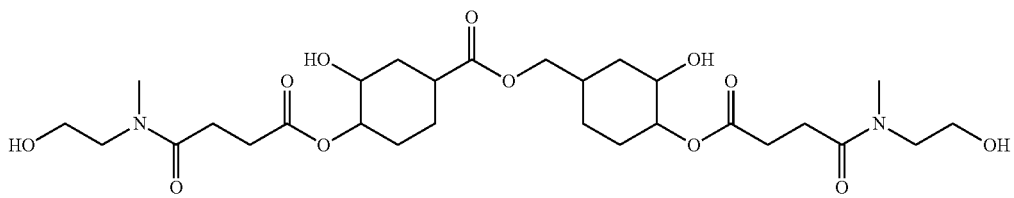

formula (XVI)

The polyhydroxyalkylamide material may have any suitable hydroxyalkylamide equivalent weight. The polyhydroxyalkylamide material may have a hydroxyalkylamide equivalent weight of at least 50 g/equivalent, such as at least 100 g/equivalent, such as at least 200 g/equivalent, such as at least 300 g/equivalent, such as at least 400 g/equivalent, such as at least 500 g/equivalent, such as at least 600 g/equivalent, or even at least 700 g/equivalent. The polyhydroxyalkylamide material may have a hydroxyalkylamide equivalent weight of up to 1000 g/equivalent. The polyhydroxyalkylamide material may have a hydroxyalkylamide equivalent weight from 50 to 1000 g/equivalent, such as from 100 to 1000 g/equivalent, such as from 200 to 1000 g/equivalent, such as from 300 to 1000 g/equivalent, such as from 400 to 1000 g/equivalent, such as from 500 to 1000 g/equivalent, such as from 600 to 1000 g/equivalent, or even from 700 to 1000 g/equivalent.

The polyhydroxyalkylamide material may have a hydroxyalkylamide equivalent weight from 50 to 200 g/equivalent.

The polyhydroxyalkylamide material may have a hydroxyalkylamide equivalent weight from 700 to 1000 g/equivalent The polyhydroxyalkylamide equivalent weight may be calculated by any suitable method. Suitable methods will be well known to a person skilled in the art. As reported herein, the polyhydroxyalkylamide equivalent weight may be calculated as the ratio of the weight-average molecular weight of the polyhydroxyalkylamide material to the hydroxyalkylamide equivalent number (Mw/hydroxyalkylamide equivalent number).

The hydroxyalkylamide equivalent weight is suitably expressed on solids.

The polyhydroxyalkylamide material may have any suitable weight-average molecular weight (Mw). The polyhydroxyalkylamide material may have an Mw of at least 500 Daltons (Da=g/mole), such as at least 1,000 Da, such as at least 2,000 Da, such as at least 2,500 Da, or even at least 5,000 Da. The polyhydroxyalkylamide material may have an Mw up to 250,000 Da, such as up to 100,000 Da, such as up to 50,000 Da, such as up to 25,000 Da, such as up to 15,000 Da, or even up to 10,000 Da. The polyhydroxyalkylamide material may have an Mw from 500 to 250,000 Da, such as from 1,000 to 250,000 Da, such as from 2,000 to 250,000 Da, such as from 2,500 to 250,000 Da, or even from 5,000 to 250,000 Da. The polyhydroxyalkylamide material may have an Mw from 500 to 100,000 Da, such as from 1,000 to 100,000 Da, such as from 2,000 to 100,000 Da, such as from 2,500 to 100,000 Da, or even from 5,000 to 100,000 Da. The polyhydroxyalkylamide material may have an Mw from 500 to 50,000 Da, such as from 1,000 to 50,000 Da, such as from 2,000 to 50,000 Da, such as from 2,500 to 50,000 Da, or even from 5,000 to 50,000 Da. The polyhydroxyalkylamide material may have an Mw from 500 to 25,000 Da, such as from 1,000 to 25,000 Da, such as from 2,000 to 25,000 Da, such as from 2,500 to 25,000 Da, or even from 5,000 to 25,000 Da. The polyhydroxyalkylamide material may have an Mw from 500 to 15,000 Da, such as from 1,000 to 15,000 Da, such as from 2,000 to 15,000 Da, such as from 2,500 to 15,000 Da, or even from 5,000 to 15,000 Da. The polyhydroxyalkylamide material may have an Mw from 500 to 10,000 Da, such as from 1,000 to 10,000 Da, such as from 2,000 to 10,000 Da, such as from 2,500 to 10,000 Da, or even from 5,000 to 10,000 Da.

The polyhydroxyalkylamide material may have an Mw from 2,500 to 25,000 Da, such as from 2,500 to 10,000 Da.

The polyhydroxyalkylamide material may have any suitable number-average molecular weight (Mn). The polyhydroxyalkylamide may have an Mn of at least 500 Daltons (Da=g/mole), such as at least 1,000 Da, such as at least 2,000 Da, such as at least 2,500 Da, or even at least 5,000 Da. The polyhydroxyalkylamide material may have an Mn up to 250,000 Da, such as up to 100,000 Da, such as up to 50,000 Da, such as up to 25,000 Da, such as up to 15,000 Da, or even up to 10,000 Da. The polyhydroxyalkylamide material may have an Mn from 500 to 250,000 Da, such as from 1,000 to 250,000 Da, such as from 2,000 to 250,000 Da, such as from 2,500 to 250,000 Da, or even from 5,000 to 250,000 Da. The polyhydroxyalkylamide material may have an Mn from 500 to 100,000 Da, such as from 1,000 to 100,000 Da, such as from 2,000 to 100,000 Da, such as from 2,500 to 100,000 Da, or even from 5,000 to 100,000 Da. The polyhydroxyalkylamide material may have an Mn from 500 to 50,000 Da, such as from 1,000 to 50,000 Da, such as from 2,000 to 50,000 Da, such as from 2,500 to 50,000 Da, or even from 5,000 to 50,000 Da. The polyhydroxyalkylamide material may have an Mn from 500 to 25,000 Da, such as from 1,000 to 25,000 Da, such as from 2,000 to 25,000 Da, such as from 2,500 to 25,000 Da, or even from 5,000 to 25,000 Da. The polyhydroxyalkylamide material may have an Mn from 500 to 15,000 Da, such as from 1,000 to 15,000

Da, such as from 2,000 to 15,000 Da, such as from 2,500 to 15,000 Da, or even from 5,000 to 15,000 Da. The polyhydroxyalkylamide material may have an Mn from 500 to 10,000 Da, such as from 1,000 to 10,000 Da, such as from 2,000 to 10,000 Da, such as from 2,500 to 10,000 Da, or even from 5,000 to 10,000 Da.

The polyhydroxyalkylamide material may have an Mn from 500 to 15,000 Da, such as from 500 to 10,000 Da.

The polyhydroxyalkylamide material may have any suitable polydispersity index (PDI). The polydispersity index of a polymer is given by the ratio of Mw to Mn (Mw/Mn), wherein Mw is the weight-average molecular weight and Mn is the number average molecular weight. The polyhydroxyalkylamide material may have a polydispersity index from 1 to 20, such as from 1 to 10, such as from 1 to 5, or even from 2 to 5.

The crosslinker may be in the form of a urea material. The crosslinker may comprise a hydroxyl substituted urea material.

Suitably, the crosslinker may comprise a hydroxy functional alkyl polyurea material.

The crosslinker may contain a terminal chemical group as shown in Formula XVII.

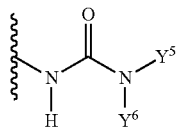

Formula XVII wherein $Y^5$ and $Y^6$ each, independently, represent hydrogen, an alkyl or a hydroxy functional alkyl having two or more carbon atoms and at least one of $Y^5$ and $Y^6$ is a hydroxyl functional alkyl having two or more carbon atoms.

The $Y^5$ and $Y^6$ groups may exclude ether linkages.

The terminal chemical group of Formula XVII may be connected to a further chemical structure, not shown. Additionally or alternatively, the chemical group of Formula XVII may be suspended from a carrier substrate, such as a silica carrier substrate, for example.

The crosslinker may contain a plurality of terminal chemical groups as shown in Formula IV. For example, the crosslinker may contain 2 to 6 terminal chemical groups as shown in Formula XVII, such as 2, 3 or 4 terminal chemical groups as shown in Formula XVII.

The crosslinker material may comprise a moiety according to Formula XVIII:

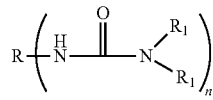

Formula XVIII wherein R with reference to Formula XVIII comprises the residue of an isocyanurate, biuret, allophonate, glycoluril, benzoguanamine, polyetheramine, and/or polymeric moiety having an Mn of 500 or greater; each $R_1$ with reference to Formula XVIII is independently a hydrogen, an alkyl or a hydroxy functional alkyl having 2 or more carbons and at least one $R_1$ with reference to Formula V is a hydroxy functional alkyl having 2 or more carbons; and n is 2-6.

Suitably, the $R_1$ group with reference to Formula XVIII may exclude ether linkages.

The crosslinker may comprise a moiety according to Formula XIX:

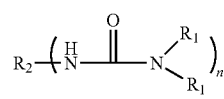

Formula XIX wherein $R_2$ with reference to Formula XIX comprises a substituted or unsubstituted $C_1$ to $C_{36}$ alkyl group, an aromatic group, or the residue of an isocyanurate, biuret, allophonate, glycoluril, benzoguanamine, polyetheramine, and/or a polymeric moiety having an Mn of 500 or greater; each R with reference to Formula VI is independently a hydrogen, an alkyl group having 1 or more carbons, or a hydroxy functional alkyl having 2 or more carbons and at least one $R_1$ with reference to Formula VI is a hydroxy functional alkyl having 2 or more carbons; and n is 2-6.

Suitably, when $R_2$ with reference to Formula XIX is a substituted or unsubstituted $C_1$ to $C_{36}$ alkyl group the acid functional polyester material comprises COOH functionality that reacts with the polyurea to form an ester linkage.

Suitably, the $R_1$ group with reference to Formula XIX may exclude ether linkages.

It will be understood that when $R_2$ with reference to Formula VI is a substituted or unsubstituted alkyl group, there may be two $R_2$ groups with reference to Formula VI attached to the N, and the two $R_2$ groups with reference to Formula VI may be the same or different. For example, if the hydroxy functional alkyl polyurea is formed from the reaction of dimethyl carbonate with dibutylamine and diisopropanol amine, there will be two $R_2$ groups with reference to Formula VI that will each be C4.

R and $R_2$ with reference to Formula XIX may comprise the residue of an isocyanurate, biuret, allophonate, glycoluril, benzoguanamine, polyetheramine and/or polymeric moiety having an Mn of 500 or greater. An isocyanurate will be understood as referring to a compound having three isocyanate groups, typically in ring form, and is sometimes referred to as a trimer. This can include compounds having one or more isocyanurate moieties. Isocyanurates can be purchased from Covestro and Vencore X Chemical. Suitable commercially available isocyanurates include those sold under the trade name DESMODUR such as, for example, DESMODUR N 3300A, DESMODUR N3800, DESMODUR N3790, DESMODUR N3400, DESMODUR N3600, DESMODUR N3900 and DESMODUR RC (commercially available from Covestro), those sold under the trade name VESTANANT such as, for example, VESTANAT T1890/100 (commercially available from Evonik) and those sold under the trade name EASAQUA such as, for example, EASAQUA WT 2102, EASAQUA X D 401, EASAQUA M 501, EASAQUA X D 803, EASAQUA M 502 and EASAQUA X L 600 (commercially available from Vencore X Chemical). Unsaturated isocyanate monomers include but are not limited to 2-acryloyloxyethylisocyanate (AOI), 2-methacryloyloxyethyl isocyanate (MOI), alpha, alpha-dimethyl meta-isopropenyl benzyl isocyanate (TMI), and the adduct of 2-hydroxyethyl acrylate (HEA) and IPDI in 1:1 ratio. A particularly suitable hydroxy functional alkyl polyurea formed from an isocyanurate is shown in Formula XX:

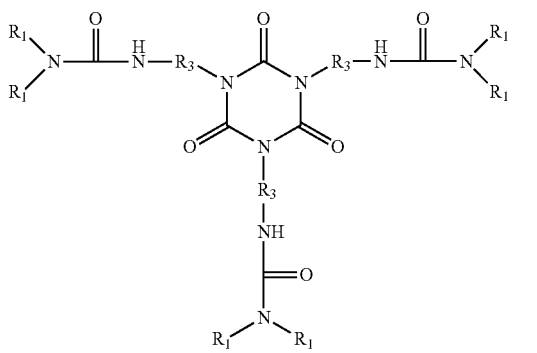

Formula XX wherein $R_1$ with reference to Formula XX is as described above; and each $R_3$ independently comprises an alkyl, aryl, alkylaryl, arylalkyl, alicyclic, and/or polyetheralkyl group.

A particularly suitable hydroxy functional alkyl polyurea formed from a bis-isocyanurate is shown below in Formula XXI:

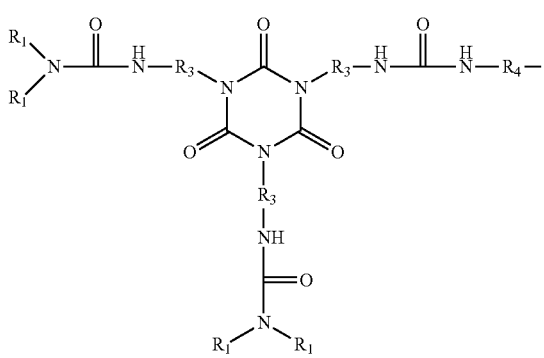

Formula XXI wherein $R_1$ and $R_3$ with reference to Formula XXI are as described above.

A biuret will be understood as referring to a compound that results upon the condensation of two molecules of urea, and is sometimes referred to as a carbamylurea. Biurets are commercial available from Vencore X Chemical and Covestro as, for example, DESMODUR N-75, DESMODUR N-100, and DESMODUR N-3200, HDB 75B, HDB 75M, HDB 75MX, HDB-LV. A particularly suitable hydroxy functional alkyl polyurea formed from a biuret is shown below in Formula XXII:

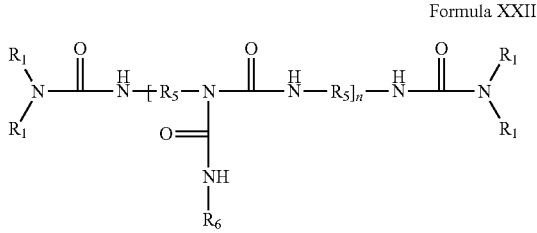

Formula XXII wherein $R_1$ with reference to Formula IX is as described above; each $R_5$ independently comprises an alkyl, aryl, alkylaryl, arylalkyl, alicyclic, and/or polyetheralkyl group; and $R_6$ comprises H or an alkyl group.

Uretidione is a dimer of diisocyanate, examples of which include DESMODUR N-3400 polyisocyanate, a blend of the trimer and uretidione of HDI:

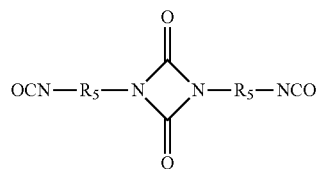

wherein each $R_5$ independently comprises an alkyl, aryl, alkylaryl, arylalkyl, alicyclic, and/or polyetheralkyl group.

An allophonate will be understood as referring to a compound made from urethane and isocyanate. A method for making an allophonate is described at Surface Coating, Vol 1, Raw material and their usage, Landon New York, Chapman and Hall, Page 106. The reaction is generally depicted below in scheme I:

Scheme I

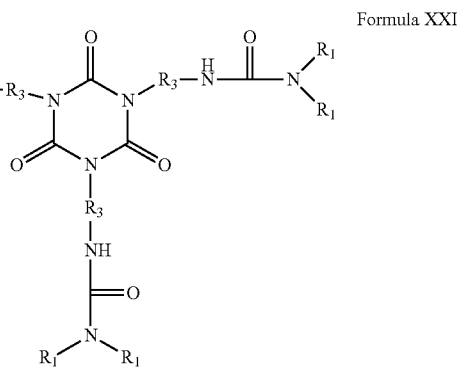

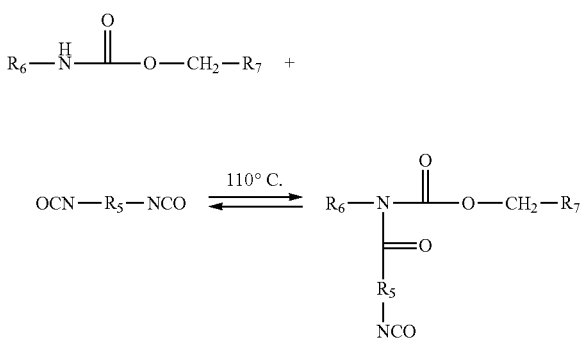

allophonate wherein $R_5$ and $R_6$ with reference to Scheme I are each as described above; and $R_7$ independently comprises the residue of a primary alcohol.

A glycoluril will be understood as referring to a compound composed of two cyclic urea groups joined across the same two-carbon chain, a suitable examples of which includes the below:

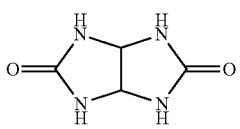

Glycoluril is widely commercially available, such as from Sigma-Aldrich. Benzoguanamine is also known as 6-phenyl-1,3,5-triazine-2,4-diamine and is commercially available from The Chemical Company, Jamestown, RI.

A polyether amine will be understood as referring to a compound having one or more amine groups attached to a polyether backbone such as one characterized by propylene oxide, ethylene oxide, or mixed propylene oxide and ethylene oxide repeating units in their respective structures, such as, for example, one of the Jeffamine series products. Examples of such polyetheramines include aminated propoxylated pentaerythritols, such as JEFFAMINE XTJ-616, and those represented by Formulas (XXIII) through (XXV).

According to Formula (XXIII) the polyether amine may comprise:

Formula XXIII

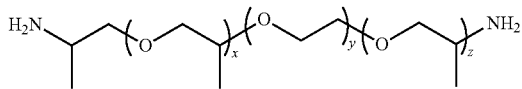

wherein y=0-39, x+z=1-68.

Suitable amine-containing compounds represented by Formula XXIII include, but are not limited to, amine-terminated polyethylene glycol such as those commercially available from Huntsman Corporation in its JEFFAMINE ED series, such as JEFFAMINE HK-511, JEFFAMINE ED-600, JEFFAMINE ED-900 and JEFFAMINE ED-2003, and amine-terminated polypropylene glycol such as in its JEFFAMINE D series, such as JEFFAMINE D-230, JEFFAMINE D-400, JEFFAMINE D-2000 and JEFFAMINE D-4000.

According to Formula XXIV the polyetheramine may comprise:

Formula XXIV

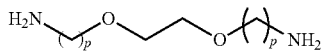

wherein each p independently is 2 or 3.

Suitable amine-containing compounds represented by Formula XXIV include, but are not limited to, amine-terminated polyethylene glycol based diamines, such as Huntsman Corporation's JEFFAMINE EDR series, such as JEFFAMINE EDR-148 and JEFFAMINE EDR-176.

According to Formula XXV the polyetheramine may comprise:

Formula XXV

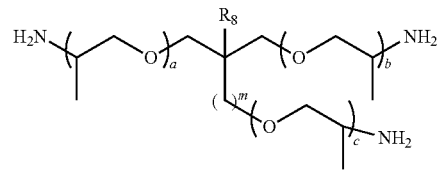

wherein $R_8$ is H or $C_2H_5$, m=0 or 1, a+b+c=5-85.

Suitable amine-containing compounds represented by Formula (XXV) include, but are not limited to, amine-terminated propoxylated trimethylolpropane or glycerol, such as Huntsman Corporation's Jeffamine T series, such as JEFFAMINE T-403, JEFFAMINE T-3000 and JEFFAMINE T-5000.

Particularly suitable are di- and tri-amines, such as 4,7,10-trioxa-1,13-tridecanediamine, JEFFAMINE D400, JEFFAMINE D4000, JEFFAMINE D2000, JEFFAMINE T403.

A "polymeric moiety" as used herein in the context of R or $R_2$ with reference to Formulas XVIII to XXII refers to any polymer or oligomer to which has been attached two to six hydroxy functional alkyl polyurea groups. The polymer can be, for example, a polyester polyurethane, a polyether polyurethane, or a polyamide polyurethane. The moiety can itself contain functionality, such as acid functionality, hydroxy functionality, and/or amine functionality. The polymeric moiety (which may be oligomeric as noted above) has an Mn of 500 or greater, such as 1000 or greater, 2500 or greater, 4000 or greater, or 5,000 or greater. Mn, as used herein, refers to the number average molecular weight and means the theoretical value as determined by Gel Permeation Chromatography using Waters 2695 separation module with a Waters 410 differential refractometer (RI detector) and polystyrene standards. The Mn values reported according to the invention were determined using this method. Tetrahydrofuran (THF) was used as the eluent at a flow rate of 1 ml min$^{-1}$, and two PL Gel Mixed C columns were used for separation.

In all cases, R and $R_2$ with reference to Formulas XVIII to XXII may be substituted or unsubstituted. $R_2$ with reference to Formulas XVIII to XXII, as noted above, may also comprise a substituted or unsubstituted $C_1$ to $C_{36}$ alkyl group and/or an aromatic group. For example, the alkyl group may have two to ten carbon atoms, such as six carbon atoms. The alkyl group may derive from an isocyanate, such as a diisocyanate. Suitable examples include isophorone diisocyanate and hexamethylene isocyanate. The aromatic group may derive from an aromatic ring containing isocyanate, suitable examples of which include methylene diphenyl diisocyanate, toluene diisocyanate and tetramethylxylylene diisocyanate.

Certain hydroxy functional alkyl polyureas of, and/or used according to, the invention may be made by reacting an isocyanate-containing compound with amino alcohol. Any isocyanate-containing compound having at least two isocyanate groups can be used, such as any of those described above. It will be appreciated that the "R" or "$R_2$" group with reference to Formulas XVIII to XXII will reflect the isocyanate-containing compound selected, if one is used.

Similarly, any amino alcohol having two or more carbon atoms can be used, and the "$R_1$" group with reference to Formulas XVIII to XXII will reflect the amino alcohol selected. The amino alcohol can have one, two or more hydroxyl functional groups. One or more amino alcohols can be used, which will result in different R groups with reference to Formulas XVIII to XXII being present on the polyurea. R with reference to Formulas XVIII to XXII can also be hydrogen or an alkyl group. Suitable amino alcohols include monoethanol amine, diethanol amine and diisopropanol amine.

The hydroxyl functional alkyl polyureas can be made by reacting amino alcohol with an isocyanate-containing compound in an organic polar solvent, such as alcohol or water. The equivalent ratio of amine to isocyanate may be 2-1:1-2, such as 1:1.

The hydroxy functional alkyl polyureas may be made by alternative methods as well. For example, amino alcohols can react with carbonate to form hydroxylalkyl carbamate, and hydroxylalkyl carbamate can further react with amines to form hydroxy functional alkyl polyureas.

The number-average molecular weight (Mn) of the hydroxy functional alkyl polyurea (even when the polyurea is in the form of a monomer or prepolymer, but not when R or R2 with reference to Formulas XVIII to XXII is a polymeric moiety) may be 100 or greater, such as 350 or greater or 1,000 or greater, and/or can be 6,000 or lower, such as 3,000 or lower, or 2,000 or lower. The Mn of the hydroxy functional alkyl polyurea when R or $R_2$ with reference to Formulas XVIII to XXII is a polymeric moiety can be 500 or greater, such as 1,000 or greater, 5,000 or greater or 10,000 or greater.

The crosslinker may be in the form of a carbodiimide resin. The crosslinker may comprise a polycarbodiimide. Suitably, the crosslinker may comprise a polycarbodiimide having the following structural units (XXVI) or (XXVII) including mixtures thereof:

(XXVI)
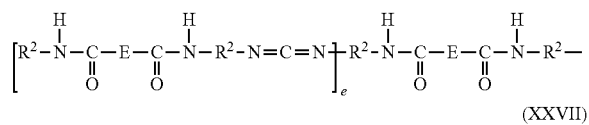

(XXVII)
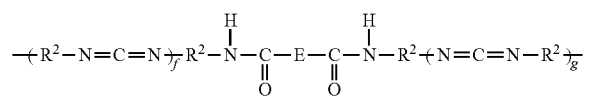

where e is an integer of from 2 to 20; f and g are each at least 1, and f+g is an integer up to 20; E is a radical selected from (XXVIII)
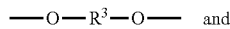

(XXIX)
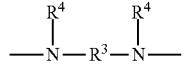

where $R^2$ with reference to structural units (XXVIII) or (XXIX) comprises a cyclic radical and $R^3$ with reference to (XXVIII) or (XXIX) is a linear hydrocarbon radical containing at least 4 carbon atoms and $R^4$ with reference to (XXIX) is hydrogen or an alkyl radical.

The polycarbodiimides may be prepared by reacting an organic group containing a polyisocyanate in the presence of a suitable catalyst to form a polycarbodiimide having terminal NCO-functionality, wherein an active hydrogen-containing compound is added before, during or after polycarbodiimide formation.

The polyisocyanate can be an aliphatic, including cycloaliphatic, or an aromatic polyisocyanate or mixture of the two. Aliphatic including cycloaliphatic polyisocyanates and alkaryl polyisocyanates are particularly suitable. The polyisocyanates can contain from 2 to 4, such as 2 isocyanate groups per molecule. Examples of suitable higher polyisocyanates are 1,2,4-benzene triisocyanate and polymethylene polyphenyl isocyanate. Examples of suitable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate and alkaryl polyisocyanates such as m-tetramethylxylene diisocyanate. Also, cycloaliphatic diisocyanates can be employed. Examples include 1,4-cyclohexyl diisocyanate, isophorone diisocyanate, alpha, alpha-xylylene diisocyanate and 4,4-methylene-bis(cyclohexyl isocyanate). Substituted organic group-containing polyisocyanates can also be used in which the substituents are nitro, chloro, alkoxy and other groups that are not reactive with hydroxyl groups or active hydrogens and provided the substituents are not positioned to render the isocyanate group unreactive.

The active hydrogen-containing compound used in the preparation of the polycarbodiimide is suitably a chain extender or spacer linking polyisocyanates together to form NCO-adducts or to link NCO-functional polycarbodiimides together. Any suitable organic compound containing active hydrogens may be used. The term "active hydrogen atoms" refers to hydrogens which, because of their position in the molecule, display activity according to the Zerewitinoff test. Accordingly, active hydrogens include hydrogen atoms attached to oxygen or nitrogen, and thus useful compounds will include those having at least two of these groups (in any combination):

—OH, and —NH$_2$

The moieties attached to each group can be aliphatic, including cycloaliphatic, aromatic, or of a mixed type with aliphatic being particularly suitable.

The active hydrogen-containing material can contain from 2 to 4, particularly suitable 2 active hydrogens per molecule.

Examples of such compounds include amines, which includes polyamines, aminoalcohols, mercapto-terminated derivatives, and alcohols that includes polyhydroxy materials (polyols) that are particularly suitable because of the ease of reaction with polyisocyanates. Also polyols generally give no side reactions, giving higher yields of urethane product with no by-product and the products are hydrolytically stable. Also, with regard to polyols, there are a wide variety of materials available which can be selected to give a wide spectrum of desired properties. In addition, the polyols have desirable reaction rates with polyisocyanates. Both saturated and unsaturated active hydrogen-containing compounds can be used, but saturated materials are particularly suitable because of superior coating properties.

The polyhydroxyl materials or polyols can be either low or high molecular weight materials and in general will have average hydroxyl values as determined by ASTM designation E-222-67, Method B, of 2000 and below, such as between 2000 and 10. The term "polyol" is meant to include materials having an average of two or more hydroxyl groups per molecule.

The polyols include low molecular weight diols, triols and higher molecular weight polyols, low molecular weight amide-containing polyols and higher polymeric polyols such as polyester polyols, polyether polyols, polycarbonate polyols and hydroxy-containing (meth)acrylic polymers. The polymers typically have hydroxyl values of from 10 to 180. Also, the polymers typically have number average molecular weights of 96 to 10,000 Da.

The low molecular weight diols, triols and higher alcohols useful in the instant invention are known in the art. They have hydroxy values of 200 or above, usually within the range of 200 to 2000. Such materials include aliphatic polyols, particularly alkylene polyols containing from 4 to 18 carbon atoms. Examples include 1,4-butanediol and 1,6-hexanediol. Also useful are polyols containing ether linkages such as diethylene glycol and tetraethylene glycol.

To form the polycarbodiimide, the polyisocyanate with or without the active hydrogen-containing compound may be condensed with the elimination of carbon dioxide to form the polycarbodiimide, that is, a polymer containing $[N{=}C{=}N]_n$ units where n with reference to the $[N{=}C{=}N]{=}2$ to 20, such as 2 to 10.

The condensation reaction is typically conducted by taking the solution of the polyisocyanate and heating in the presence of suitable catalyst. Examples of catalyst include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the polyisocyanate being used. A concentration range of 0.05-5 parts of catalyst per 100 parts of adduct is generally suitable.

The resulting polycarbodiimide has terminal NCO groups that can then be reacted with an active hydrogen-containing hydrophilic compound.

The hydrophilic compound may be a polyether alcohol or polyether amine or mixtures thereof having a polyether backbone, typically based on ethylene oxide or mixed ethylene oxide and propylene and having a molecular weight greater than 500, such as at least 1000 on a number average basis. Typical alcohols and amines have the following structural formula:

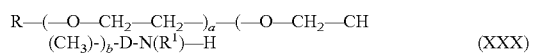

(XXX)

or

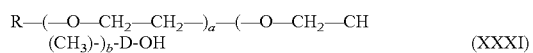

(XXXI)

where R with reference to formulas (XXX) and (XXXI) is C1 to C4 alkyl; a with reference to formulas (XXX) and (XXXI) is 5 to 50 and b with reference to formulas (XXX) and (XXXI) is 0 to 35, and when b with reference to formulas (XXX) and (XXXI) is present the mole ratio of a to b with reference to formulas (XXX) and (XXXI) is at least 1:1; $R^1$ with reference to formula (XVIII) is hydrogen or a hydrocarbon radical and D with reference to formulas (XXX) and (XXXI) is a divalent linking group or a chemical bond.

Reaction of the polyether alcohol or amine with the NCO-containing carbodiimide may be conducted with a stoichiometric equivalent of amine to NCO equivalents or a slight excess of alcohol or amine and at a temperature typically from 80 to 110° C. until an IR spectrum of the reaction mixture indicates substantially no remaining NCO functionality.

Depending on when the active hydrogen chain extender or spacer is used in the reaction, the polycarbodiimide has a structure such that each carbodiimide unit or polycarbodiimide unit is attached to a unit selected from urethane, thiourethane urea, thiourea and a hydrophilic unit occurs at one or terminal positions of the polycarbodiimide via a urethane or urea linkage.

Typically, the polycarbodiimide has a weight average molecular weight of 2600 to 12,000, such as 3000 to 10,000, and a diimide equivalent weight (number average molecular weight/number of carbodiimide groups) of at least 600, such as 600 to 2000.

When the active hydrogen chain extender is added before or during polycarbodiimide formation, that is, is used to chain extend a polyisocyanate to form an NCO-adduct, the polycarbodiimide can be represented from the following structural formula when the polyisocyanate and the active hydrogen-containing compound are difunctional:

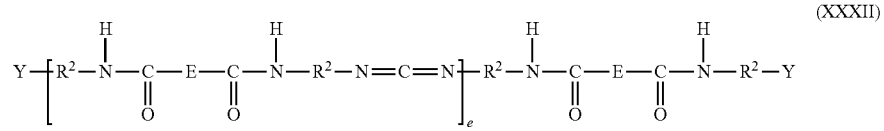

(XXXII)

where e with reference to formula (XXXII) is an integer of from 2 to 20, such as 2 to 10; E with reference to formula (XXXII) is a radical selected from

(XXXIII)

and

(XXXIV)

where $R^2$ with reference to formula (XXXII) is a cyclic radical such as a cycloaliphatic or an alkaryl radical that may contain 6 to 20 carbon atoms such as those of the structure:

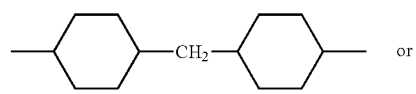

or

-continued

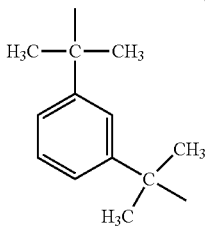

R³ with reference to formula (XXXIII) and (XXXIV) is a linear hydrocarbon radical optionally including hetero atoms containing at least 4 carbon atoms such as a polyethylene group having a number average molecular weight of 96 to 10,000. R⁴ with reference to formula (XXXIV) is hydrogen or a hydrocarbon radical such as alkyl containing from 1 to 4 carbon atoms. Y with reference to formula (XXXII) is a radical of the structure:

R—(—O—CH₂—CH₂—)ₐ—(—O—CH₂—CH(CH₃)-)ᵦ-D-N(R¹)—C(O)—NH—    (XXXV)

or

R—(—O—CH₂—CH₂—)ₐ—(—O—CH₂—CH(CH₃)-)ᵦ-D-O—C(O)—NH—    (XXXVI)

where R with reference to formula (XXXV) and (XXXVI) is $C_1$ to $C_4$ alkyl; a with reference to formula (XXXV) and (XXXVI) is 5 to 50 and b with reference to formula (XXXV) and (XXXVI) is 0 to 35, and when b with reference to formulas (XXXV) and (XXXVI) is present the mole ratio of a to b with reference to formulas (XXXV) and (XXXVI) is at least 1:1; R¹ with reference to formula (XXXV) is hydrogen or a hydrocarbon radical and D with reference to formula (XXXV) and (XXXVI) is a divalent linking group or a chemical bond.

When the active hydrogen chain extender is added after polycarbodiimide formation, that is, is used to chain extend an NCO-functional polycarbodiimide, the polycarbodiimide can be represented from the following structural formula when the NCO-functional polycarbodiimide and the active hydrogen-containing compound are difunctional.

(XXXVII)

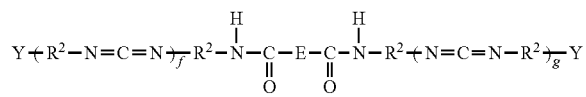

where f and g with reference to formula (XXXVII) are each at least 1, and f+g with reference to formula (XXXVII) is an integer up to 20 such as up to 10; E with reference to formula (XXXVII) is a radical selected from

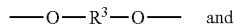 and    (XXXVIII)

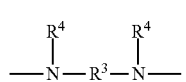    (XXXIX)

where R², R³, R⁴ and Y with reference to formulas (XXXVII), (XXXVIII) and (XXXIX) have the meanings mentioned above for (XXXII).

Organic solvent can optionally be present in the synthesis of the polycarbodiimide. Polar water miscible solvents such as N-methyl pyrrolidone can be used in amounts of about 5-25 percent by weight based on weight of the reaction mixture.

Suitably, the crosslinker material may be water soluble. For example, the crosslinker may comprise a β-hydroxyalkylamide material which is water soluble.

The coating composition may comprise any suitable weight ratio of solution polymerised acrylic material to emulsion polymerised acrylic latex material. The weight ration of solution polymerised acrylic material to emulsion polymerised acrylic latex material may be from 1 to 50:99 to 50, suitably from 2 to 40:98 to 60, such as from 5 to 20:95 to 80, or even from 5 to 15:95 to 85. The weight ratio of solution polymerised acrylic material to emulsion polymerised acrylic latex material may be from 1. Suitably, the weight ratio of solution polymerised acrylic material to emulsion polymerised acrylic latex material may be 10:90.

The coating compositions of the present invention may comprise any suitable amount of solution polymerised acrylic material. The coating compositions may comprise from 0.5 to 90 wt %, suitably from 1 to 75 wt %, such as from 1 to 50 wt %, such as from 2 to 40 wt %, such as from 5 to 20 wt %, such as from 5 to 15 wt % of solution polymerised acrylic material based on the total solid weight of the coating composition.

The coating composition may comprise at least 0.5 wt %, suitably at least 1 wt %, such as at least 2 wt %, or even at least 5 wt % of solution polymerised acrylic material based on the total solid weight of the coating composition. The coating composition may comprise up to 90 wt %, suitably up to 75 wt %, such as up to 50 wt %, such as up to 40 wt %, such as up to 20 wt %, or even up to 15 wt % of solution polymerised acrylic material based on the total solid weight of the coating composition.

The coating composition may comprise from 0.5 to 90 wt %, suitably from 1 to 90 wt %, such as from 2 to 90 wt %, or even from 5 to 90 wt % of solution polymerised acrylic material based on the total solid weight of the coating composition. The coating composition may comprise from 0.5 to 75 wt %, suitably from 1 to 75 wt %, such as from 2 to 75 wt %, or even from 5 to 75 wt % of solution polymerised acrylic material based on the total solid weight of the coating composition. The coating composition may comprise from 0.5 to 50 wt %, suitably from 1 to 50 wt %, such as from 2 to 50 wt %, or even from 5 to 50 wt % of solution polymerised acrylic material based on the total solid weight of the coating composition. The coating composition may comprise from 0.5 to 40 wt %, suitably from 1 to 40 wt %, such as from 2 to 40 wt %, or even from 5 to 40 wt % of solution polymerised acrylic material based on the total solid weight of the coating composition. The coating composition may comprise from 0.5 to 20 wt %, suitably from 1 to 20 wt %, such as from 2 to 20 wt %, or even from 5 to 20 wt % of solution polymerised acrylic material based on the total solid weight of the coating composition. The coating composition may comprise from 0.5 to 15 wt %, suitably from 1 to 15 wt %, such as from 2 to 15 wt %, or even from 5 to 15 wt % of solution polymerised acrylic material based on the total solid weight of the coating composition.

Suitably, the coating composition may comprise from 1 to 75 wt %, such as from 5 to 20 wt %, or even from 5 to 10 wt % of solution polymerised acrylic material based on the total solid weight of the coating composition.

Suitably, the coating composition may comprise 10 wt % of solution polymerised acrylic material based on the total solid weight of the coating composition.

The coating compositions of the present invention may comprise any suitable amount of emulsion polymerised acrylic latex material. The coating compositions may comprise from 1 to 99 wt %, suitably from 10 to 95 wt %, such as from 20 to 90 wt %, such as from 50 to 90 wt %, such as from 60 to 90 wt %, such as from 70 to 90 wt %, or even from 80 to 90 wt % of emulsion polymerised acrylic latex material based on the total solid weight of the coating composition.

The coating composition may comprise at least 1 wt %, suitably at least 10 wt %, such as at least 20 wt %, such as at least 50 wt %, such as at least 60 wt %, such as at least 70 wt %, or even at least 80 wt % of emulsion polymerised acrylic latex material based on the total solid weight of the coating composition. The coating composition may comprise up to 99 wt %, suitably up to 95 wt %, such as up to 90 wt % of emulsion polymerised acrylic latex material based on the total solid weight of the coating composition.

The coating composition may comprise from 1 to 99 wt %, suitably from 10 to 99 wt %, such as from 20 to 99 wt %, such as from 50 to 99 wt %, such as from 60 to 99 wt %, such as from 70 to 99 wt %, or even from 80 to 99 wt % of emulsion polymerised acrylic latex material based on the total solid weight of the coating composition. The coating composition may comprise from 1 to 95 wt %, suitably from 10 to 95 wt %, such as from 20 to 95 wt %, such as from 50 to 95 wt %, such as from 60 to 95 wt %, such as from 70 to 95 wt %, or even from 80 to 99 wt % of emulsion polymerised acrylic latex material based on the total solid weight of the coating composition. The coating composition may comprise from 1 to 90 wt %, suitably from 10 to 90 wt %, such as from 20 to 90 wt %, such as from 50 to 90 wt %, such as from 60 to 90 wt %, such as from 70 to 90 wt %, or even from 80 to 90 wt % of emulsion polymerised acrylic latex material based on the total solid weight of the coating composition.

The coating compositions of the present invention may comprise any suitable amount of crosslinker material operable to crosslink acid functionality on the solution polymerised acrylic material and/or emulsion polymerised acrylic latex material.

The coating composition may comprise from 0.01 to 0.5, suitably from 0.05 to 0.5, such as from 0.1 to 0.5, such as from 0.2 to 0.5, such as from 0.25 to 0.5, or even from 0.3 to 0.5 equivalents of crosslinker material per equivalent of acid groups of the solution polymerised acrylic material and/or emulsion polymerised acrylic latex material. Suitably, the coating composition may comprise less than 0.5 equivalents of crosslinker material per equivalent of acid groups of the solution polymerised acrylic material and/or emulsion polymerised acrylic latex material. The coating composition may comprise from 0.01 to 0.5, suitably from 0.05 to 0.5, such as from 0.1 to 0.5, such as from 0.2 to 0.5, such as from 0.25 to 0.5, or even from 0.3 to 0.5 equivalents of crosslinker material per equivalent of acid groups of the emulsion polymerised acrylic latex material. Suitably, the coating composition may comprise less than 0.5 equivalents of crosslinker material per equivalent of acid groups of the emulsion polymerised acrylic latex material The coating composition may comprise from 0.5 to 50 wt %, suitably from 1 to 40 wt %, such as from 1 to 30 wt %, such as from 1.5 to 20 wt %, such as from 1.5 to 10 wt %, such as from 2 to 8 wt %, or even from 2 to 6 wt % of crosslinker material based on the total solid weight of the coating composition.

The coating composition may comprise from 0.5 to 50 wt %, suitably from 1 to 50 wt %, such as from 1.5 to 50 wt %, or even from 2 to 50 wt % of crosslinker material based on the total solid weight of the coating composition. The coating composition may comprise from 0.5 to 40 wt %, suitably from 1 to 40 wt %, such as from 1.5 to 40 wt %, or even from 2 to 40 wt % of crosslinker material based on the total solid weight of the coating composition. The coating composition may comprise from 0.5 to 30 wt %, suitably from 1 to 30 wt %, such as from 1.5 to 30 wt %, or even from 2 to 30 wt % of crosslinker material based on the total solid weight of the coating composition. The coating composition may comprise from 0.5 to 20 wt %, suitably from 1 to 20 wt %, such as from 1.5 to 20 wt %, or even from 2 to 20 wt % of crosslinker material based on the total solid weight of the coating composition. The coating composition may comprise from 0.5 to 10 wt %, suitably from 1 to 10 wt %, such as from 1.5 to 10 wt %, or even from 2 to 10 wt % of crosslinker material based on the total solid weight of the coating composition. The coating composition may comprise from 0.5 to 8 wt %, suitably from 1 to 8 wt %, such as from 1.5 to 8 wt %, or even from 2 to 8 wt % of crosslinker material based on the total solid weight of the coating composition. The coating composition may comprise from 0.5 to 6 wt %, suitably from 1 to 6 wt %, such as from 1.5 to 6 wt %, or even from 2 to 6 wt % of crosslinker material based on the total solid weight of the coating composition.

When the crosslinker material comprises a hydroxy (alkyl) amide resin, the coating composition may comprise any suitable amount of crosslinker material comprising a hydroxy (alkyl) amide resin. The coating composition may comprise from 0.5 to 50 wt %, suitably from 1 to 40 wt %, such as from 1 to 30 wt %, such as from 1.5 to 20 wt %, such as from 2 to 8 wt %, or even from 2 to 6 wt % of crosslinker material comprising a hydroxy (alkyl) amide resin based on the total solid weight of the coating composition.

The coating composition may comprise from 0.5 to 50 wt %, suitably from 1 to 50 wt %, such as from 1.5 to 50 wt %, or even from 2 to 50 wt % of crosslinker material comprising a hydroxy (alkyl) amide resin based on the total solid weight of the coating composition. The coating composition may comprise from 0.5 to 40 wt %, suitably from 1 to 40 wt %, such as from 1.5 to 40 wt %, or even from 2 to 40 wt % of crosslinker material comprising a hydroxy (alkyl) amide resin based on the total solid weight of the coating composition. The coating composition may comprise from 0.5 to 30 wt %, suitably from 1 to 30 wt %, such as from 1.5 to 30 wt %, or even from 2 to 30 wt % of crosslinker material comprising a hydroxy (alkyl) amide resin based on the total solid weight of the coating composition. The coating composition may comprise from 0.5 to 20 wt %, suitably from 1 to 20 wt %, such as from 1.5 to 20 wt %, or even from 2 to 20 wt % of crosslinker material comprising a hydroxy (alkyl) amide resin based on the total solid weight of the coating composition. The coating composition may comprise from 0.5 to 10 wt %, suitably from 1 to 10 wt %, such as from 1.5 to 10 wt %, or even from 2 to 10 wt % of crosslinker material comprising a hydroxy (alkyl) amide resin based on the total solid weight of the coating composition. The coating composition may comprise from 0.5 to 8 wt %, suitably from 1 to 8 wt %, such as from 1.5 to 8 wt %, or even from 2 to 8 wt % of crosslinker material comprising a hydroxy (alkyl) amide resin based on the total solid weight of the coating composition. The coating composition may comprise from 0.5 to 6 wt %, suitably from 1 to 6 wt %, such as from 1.5 to 6 wt %, or even from 2 to 6 wt % of crosslinker material comprising a hydroxy (alkyl) amide resin based on the total solid weight of the coating composition.

Suitably, the coating composition may comprise 3 to 5 wt % of crosslinker material comprising a hydroxy (alkyl) amide resin based on the total solid weight of the coating composition.

Advantageously, the coating compositions of the present invention may comprise less than 10 wt %, such as less than 7.5 wt %, or even less than 6 wt % of crosslinker material comprising a hydroxy (alkyl) amide resin based on the total solid weight of the coating composition. It is an advantage that the coatings of the present invention may comprise less crosslinker material comprising a hydroxy (alkyl) amide resin than would typically be expected.

The coating compositions of the present invention may further comprise a solvent. The coating composition may comprise a single solvent or a mixture of solvents. The solvent may comprise water, an organic solvent, a mixture of water and an organic solvent or a mixture of organic solvents. Suitably, the coating composition may comprise water and an organic solvent or a mixture of organic solvents.

The organic solvent suitably has sufficient volatility to essentially entirely evaporate from the coating composition during the curing process. As a non-limiting example, the curing process may be by heating at 130-230° C. for 1-15 minutes.

Suitable organic solvents include, but are not limited to the following: aliphatic hydrocarbons such as mineral spirits and high flash point naphtha; aromatic hydrocarbons such as benzene; toluene; xylene; solvent naphtha 100, 150, 200; those available from Exxon-Mobil Chemical Company under the SOLVESSO® trade name; alcohols such as ethanol; n-propanol; isopropanol; and n-butanol; ketones such as acetone; cyclohexanone; methylisobutyl ketone; methyl ethyl ketone; esters such as ethyl acetate; butyl acetate; n-hexyl acetate; RHODIASOLV® RPDE (a blend of succinic and adipic esters commercially available from Rhodia); glycols such as butyl glycol; glycol ethers such as methoxypropanol; ethylene glycol monomethyl ether; ethylene glycol monobutyl ether and combinations thereof.

The solvent, when present, may suitably be used in the coating composition in amounts from 1 to 90 wt %, suitably from 5 to 95 wt %, such as from 10 to 90 wt %, or even from 20 to 80 wt % based on the total solid weight of the coating composition. Suitably, the solvent, when present, may be used in the coating composition in amounts from 50 to 80 wt % based on the total solid weight of the coating composition.

The solution polymerised acrylic material and/or emulsion polymerised acrylic latex material may be dissolved or dispersed in the said solvent during and/or after its formation. Suitably, the solution polymerised acrylic material may be dissolved or dispersed in an organic solvent during its formation and may subsequently be dissolved or dispersed in water.

The coating compositions of the present invention may further comprise a catalyst. Any catalyst typically used to catalyse crosslinking reactions between acrylic materials and crosslinking agents may be used. Suitable catalysts will be well known to the person skilled in the art. The catalyst may be a non-metal or a metal catalyst or a combination thereof. Suitable non-metal catalysts include, but are not limited to the following: phosphoric acid; blocked phosphoric acid; phosphatised resins such as, for example, phosphatised epoxy resins and phosphatised acrylic resins; CYCAT® XK 406 N (commercially available from Allnex); sulfuric acid; sulfonic acid; CYCAT 600 (commercially available from Allnex); NACURE® 5076 or NACURE 5925 (commercially available from King industries); acid phosphate catalyst such as NACURE XC 235 (commercially available from King Industries); and combinations thereof. Suitable metal catalysts will be well known to the person skilled in the art. Suitable metal catalysts include, but are not limited to the following: tin containing catalysts, such as monobutyl tin tris (2-ethylhexanoate); zirconium containing catalysts, such as KKAT® 4205 (commercially available from King Industries); titanate based catalysts, such as tetrabutyl titanate TnBT (commercially available from Sigma Aldrich); and combinations thereof.

The catalyst, when present, may be used in the coating composition in any suitable amount. The catalyst, when present, may be used in amounts from 0.001 to 10 wt %, suitably from 0.001 to 5 wt %, such as from 0.01 to 5 wt %, such as from 0.05 to 3 wt %, such as from 0.1 to 2 wt %, or even from 0.1 to 1 wt % based on the total solid weight of the coating composition. Suitably, the catalyst, when present, may be used in amounts from 0.1 to 0.5 wt % based on the total solid weight of the coating composition.

The coating composition may comprise at least 0.001 wt %, suitably at least 0.01 wt %, such as at least 0.05 wt %, or even at least 0.1 wt % of catalyst based on the total solid weight of the coating composition. The coating composition may comprise up to 10 wt %, suitably up to 5 wt %, such as up to 3 wt %, such as up to 2 wt %, such as up to 1 wt %, or even up to 0.5 wt % of catalyst based on the total solid weight of the coating composition. The coating composition may comprise from 0.001 to 10 wt %, suitably from 0.01 to 10 wt %, such as from 0.05 wt % to 10 wt %, or even from 0.1 to 10 wt % of catalyst based on the total solid weight of the coating composition. The coating composition may comprise from 0.001 to 5 wt %, suitably from 0.01 to 5 wt %, such as from 0.05 wt % to 5 wt %, or even from 0.1 to 5 wt % of catalyst based on the total solid weight of the coating composition. The coating composition may comprise from 0.001 to 3 wt %, suitably from 0.01 to 3 wt %, such as from 0.05 wt % to 3 wt %, or even from 0.1 to 3 wt % of catalyst based on the total solid weight of the coating composition. The coating composition may comprise from 0.001 to 2 wt %, suitably from 0.01 to 2 wt %, such as from 0.05 wt % to 2 wt %, or even from 0.1 to 2 wt % of catalyst based on the total solid weight of the coating composition. The coating composition may comprise from 0.001 to 1 wt %, suitably from 0.01 to 1 wt %, such as from 0.05 wt % to 1 wt %, or even from 0.1 to 1 wt % of catalyst based on the total solid weight of the coating composition. The coating composition may comprise from 0.001 to 0.5 wt %, suitably from 0.01 to 0.5 wt %, such as from 0.05 wt % to 0.5 wt %, or even from 0.1 to 0.5 wt % of catalyst based on the total solid weight of the coating composition.

Suitably, the coating composition may comprise phosphoric acid or derivatives thereof. Derivatives of phosphoric acid include, but are not limited to blocked phosphoric acid; phosphatised resins such as, for example, phosphatised epoxy resins and phosphatised acrylic resins; and combinations thereof. Suitably, the coating composition may comprise phosphoric acid.

The coating composition may comprise at least 0.001 wt %, suitably at least 0.01 wt %, such as at least 0.05 wt %, or even at least 0.1 wt % of phosphoric acid or derivatives thereof based on the total solid weight of the coating composition. The coating composition may comprise up to 10 wt %, suitably up to 5 wt %, such as up to 3 wt %, such as up to 2 wt %, such as up to 1 wt %, or even up to 0.5 wt % of phosphoric acid or derivatives thereof based on the total solid weight of the coating composition. The coating composition may comprise from 0.001 to 10 wt %, suitably from 0.01 to 10 wt %, such as from 0.05 wt % to 10 wt %, or even from 0.1 to 10 wt % of phosphoric acid or derivatives thereof based on the total solid weight of the coating composition. The coating composition may comprise from 0.001 to 5 wt %, suitably from 0.01 to 5 wt %, such as from 0.05 wt % to 5 wt %, or even from 0.1 to 5 wt % phosphoric acid or derivatives thereof based on the total solid weight of the coating composition. The coating composition may comprise from 0.001 to 3 wt %, suitably from 0.01 to 3 wt %, such as from 0.05 wt % to 3 wt %, or even from 0.1 to 3 wt % of phosphoric acid or derivatives thereof based on the total solid weight of the coating composition. The coating composition may comprise from 0.001 to 2 wt %, suitably from 0.01 to 2 wt %, such as from 0.05 wt % to 2 wt %, or even from 0.1 to 2 wt % of phosphoric acid or derivatives thereof based on the total solid weight of the coating composition. The coating composition may comprise from 0.001 to 1 wt %, suitably from 0.01 to 1 wt %, such as from 0.05 wt % to 1 wt %, or even from 0.1 to 1 wt % of phosphoric acid or derivatives thereof based on the total solid weight of the coating composition. The coating composition may comprise from 0.001 to 0.5 wt %, suitably from 0.01 to 0.5 wt %, such as from 0.05 wt % to 0.5 wt %, or even from 0.1 to 0.5 wt % of phosphoric acid or derivatives thereof based on the total solid weight of the coating composition.

Advantageously, it has been found by the present inventors that the use of a catalyst, such as phosphoric acid or derivatives thereof, in combination with the crosslinker material (c) provides better adhesion than would typically be expected.

The coating compositions of the present invention may comprise a further resin material. Suitable further resin materials will be well known to a person skilled in the art. Suitable examples of further resin materials include, but are not limited to the following: polyester resins; acrylic resins; polyvinyl chloride (PVC) resins; alkyd resins; polyurethane resins; polysiloxane resins; epoxy resins or combinations thereof.

The coating compositions of the present invention may comprise other optional materials well known in the art of formulating coatings, such as colorants, plasticizers, abrasion-resistant particles, anti-oxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries.

As used herein, the term "colorant" means any substance that imparts colour and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

The colorant, when present, may be used in the coating composition in any suitable amount. The colorant, when present, may be used in the coating composition in amounts up to 90 wt %, such as up to 50 wt %, or even up to 10 wt % based on the total solid weight of the coating composition.

Suitable lubricants will be well known to the person skilled in the art. Suitable examples of lubricants include, but are not limited to the following: carnauba wax and polyethylene type lubricants. The lubricant, when present, may be used in the coating composition in amounts of at least 0.01 wt % based on the total solid weight of the coating composition.

Surfactants may optionally be added to the coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from 0.01 wt % to 10 wt %, suitably from 0.01 to 5 wt %, such as from 0.01 to 2 wt % based on the total solid weight of the coating composition.

The coating compositions of the present invention may be substantially free, may be essentially free or may be completely free of bisphenol A (BPA) and derivatives thereof. Derivatives of bisphenol A include, for example, bisphenol A diglycidyl ether (BADGE). The coating compositions of the present invention may also be substantially free, may be essentially free or may be completely free of bisphenol F (BPF) and derivatives thereof. Derivatives of bisphenol F include, for example, bisphenol F diglycidyl ether (BPFG). The compounds or derivatives thereof mentioned above may not be added to the composition intentionally but may be present in trace amounts because of unavoidable contamination from the environment. "Substantially free" refers to coating compositions, or components thereof, containing less than 1000 parts per million (ppm) of any of the compounds or derivatives thereof mentioned above. "Essentially free" refers to coating compositions, or components thereof, containing less than 100 ppm of any of the compounds or derivatives thereof mentioned above. By "Completely free" refers to coating compositions, or components thereof, containing less than 20 parts per billion (ppb) of any of the compounds or derivatives thereof mentioned above.

The coating compositions of the present invention may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating compositions of the present invention may be applied to a substrate, or a portion thereof, as a single layer or as part of a multi layer system. The coating composition may be applied as a single layer. The coating compositions may be applied to an uncoated substrate. For the avoidance of doubt an uncoated substrate extends to a surface that is cleaned prior to application. The coating compositions may be applied on top of another paint layer as part of a multi layer system. For example, the coating composition may be applied on top of a primer. The coating compositions may form an intermediate layer or a top coat layer. The coating composition may be applied as the first coat of a multi coat system. The second, third, fourth etc. coats may comprise any suitable paint such as those containing, for example, epoxy resins; polyester resins; polyurethane resins; polysiloxane resins; hydrocarbon resins or combinations thereof. The second, third, fourth etc. coats may comprise polyester resins. The second, third, fourth etc. coats may be a liquid coating or a powder coating, suitably a powder coating. Suitably, the coating compositions may be applied on top of a primer.

The coating compositions may be applied to a substrate once or multiple times.

The coating compositions of the first and second aspects of the present invention may be applied to any suitable substrate. The coating compositions may be applied to a metal substrate. Examples of suitable metal substrates include, but are not limited to, food and/or beverage packaging, components used to fabricate such packaging or monobloc aerosol cans and/ortubes. Suitably, the food and/or beverage packaging may be a can. Examples of cans include, but are not limited to one or more of the following, two-piece cans, three-piece cans and the like. Suitable examples of monobloc aerosol cans and/or tubes include, but are not limited to, deodorant and hair spray containers. Monobloc aerosol cans and/or tubes may be aluminium monobloc aerosol cans and/or tubes. Suitably, the coating compositions may be applied to food and/or beverage packaging or components used to fabricate such packaging.

The application of various pre-treatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coating compositions of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a food and/or beverage package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating compositions can be applied to the interior and/or the exterior of the package. The coating compositions and/or coating systems could also be applied as a rim coat to the bottom of the can. The rim coat functions to reduce friction for improved handling during the continued fabrication and/or processing of the can. The coating compositions can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

The coating compositions of the present invention may be applied to at least a portion of the metal substrate. For example, when the coating compositions are applied to a food and/or beverage can, the coating compositions may be applied to at least a portion of an internal and/or external surface of said food and/or beverage can. Suitably, when the coating compositions are applied to a food and/or beverage can, the coating compositions may be applied to at least a portion of an internal surface of said food and/or beverage can.

The substrate may be formed from any suitable material. Suitable materials will be well known to a person skilled in the art. Suitable examples include, but are not limited to the following: steel; tinplate; tinplate pre-treated with a protective material such as chromium, titanium, titanate or aluminium; tin-free steel (TFS); galvanised steel, such as for example electro-galvanised steel; aluminium; aluminium alloy; and combinations thereof. Suitably, the substrate may be formed from steel, tinplate, tin-plate pre-treated with a protective material such as chromium, titanium, titanate or aluminium, tin-free steel (TFS), galvanised steel, such as for example electro-galvanised steel or combinations thereof.

The coating compositions of the present invention may be applied to the substrate by any suitable method. Methods of applying the coating compositions of the present invention will be well known to a person skilled in the art. Suitable application methods for the coating compositions of the present invention include, but are not limited to the following: electrocoating such as electrodeposition; spraying; electrostatic spraying; dipping; rolling; brushing; and the like. Suitably, the coating compositions of the present invention may be applied to the substrate by spraying. Thus, suitably the coating compositions of the present invention may be a spray composition. For the avoidance of doubt, by the term 'spray composition' and like terms as used herein is meant, unless specified otherwise, that the coating is suitable to be applied to a substrate by spraying, i.e. is sprayable.

It has surprisingly and advantageously been found by the present inventors that the combination of a solution polymerised acrylic material and an emulsion polymerised acrylic latex material enables the coating compositions to be used in spray compositions, i.e. coating compositions that are applied by spraying application methods.

The coating compositions of the present invention may be applied to any suitable dry film thickness. The coating compositions of the present invention may be applied to a dry film thickness from 1 to 100 microns (µm), suitably from 2 to 75 µm, such as from 3 to 50 µm, or even from 4 to 40 µm.

According to an eight aspect of the present invention there is provided a coating composition, the coating composition comprising:
  a) an emulsion polymerised acrylic latex material, wherein the emulsion polymerised acrylic latex material has acid functionality; and
  b) a crosslinker material comprising a phenolic resin operable to crosslink the acid functionality on the emulsion polymerised acrylic latex material,
wherein the emulsion polymerised acrylic latex material is obtainable by a method comprising the steps of:
  i) adding an initiator to an aqueous carrier to form an aqueous initiator mixture;
  ii) adding a monomer component comprising one or more acrylic monomer(s) to the aqueous initiator mixture of step a) to form an aqueous dispersion; and
  iii) polymerising the aqueous dispersion to form an emulsion polymerised acrylic latex material,
and wherein the monomer component is added to the aqueous initiator mixture of step i) over a time period, T, of 1 to 24 hours.

According to a ninth aspect of the present invention there is provided a coating composition, the coating composition comprising:
  a) a solution polymerised acrylic material;
  b) an emulsion polymerised acrylic latex material, wherein one or both of the solution polymerised acrylic material and the emulsion polymerised acrylic latex material have acid functionality; and
  c) a crosslinker material comprising a phenolic resin operable to crosslink the acid functionality on the solution polymerised acrylic material and/or emulsion polymerised acrylic latex material.

According to a tenth aspect of the present invention there is provided a food and/or beverage package coated on at least a portion thereof with a coating, the coating being derived from a coating composition, the coating composition comprising:
  a) an emulsion polymerised acrylic latex material, wherein the emulsion polymerised acrylic latex material has acid functionality; and
  b) a crosslinker material comprising a phenolic resin operable to crosslink the acid functionality on the emulsion polymerised acrylic latex material,
wherein the emulsion polymerised acrylic latex material is obtainable by a method comprising the steps of:
  i) adding an initiator to an aqueous carrier to form an aqueous initiator mixture;
  ii) adding a monomer component comprising one or more acrylic monomer(s) to the aqueous initiator mixture of step a) to form an aqueous dispersion; and
  iii) polymerising the aqueous dispersion to form an emulsion polymerised acrylic latex material,
and wherein the monomer component is added to the aqueous initiator mixture of step i) over a time period, T, of 1 to 24 hours.

According to an eleventh aspect of the present invention there is provided a food and/or beverage package coated on at least a portion thereof with a coating, the coating being derived from a coating composition, the coating composition comprising:
  a) a solution polymerised acrylic material;
  b) an emulsion polymerised acrylic latex material, wherein one or both of the solution polymerised acrylic material and the emulsion polymerised acrylic latex material have acid functionality; and c) a crosslinker material comprising a phenolic resin operable to crosslink the acid functionality on the solution polymerised acrylic material and/or emulsion polymerised acrylic latex material.

Suitable features of the eight, ninth, tenth and/or eleventh aspects of the present invention are as defined above in relation to the first, second, third, fourth, fifth, sixth and/or seventh aspects of the present invention.

The term "alk" or "alkyl", as used herein unless otherwise defined, relates to saturated hydrocarbon radicals being straight, branched, cyclic or polycyclic moieties or combinations thereof and contain 1 to 20 carbon atoms, preferably 1 to 10 carbon atoms, more preferably 1 to 8 carbon atoms, still more preferably 1 to 6 carbon atoms, yet more preferably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like.

The term "alkenyl", as used herein, relates to hydrocarbon radicals having a double bond, such as up to 4, double bonds, being straight, branched, cyclic or polycyclic moieties or combinations thereof and containing from 2 to 18 carbon atoms, such as 2 to 10 carbon atoms, such as from 2 to 8 carbon atoms, such as 2 to 6 carbon atoms, such as 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=CH₂, becomes ethenylene, —CH=CH—, when represented as an alkenylene. Other alkenylene groups should be understood accordingly.

The term "alkynyl", as used herein, relates to hydrocarbon radicals having a triple bond, such as up to 4, triple bonds, being straight, branched, cyclic or polycyclic moieties or combinations thereof and having from 2 to 18 carbon atoms, such as 2 to 10 carbon atoms, such as from 2 to 8 carbon atoms, such as from 2 to 6 carbon atoms, such as 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, entynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like.

The term "Het", when used herein, includes four-to-twelve-membered, preferably four-to-ten-membered ring systems, which rings contain one or more heteroatoms selected from nitrogen, oxygen, sulphur and mixtures thereof, and which rings may contain one or more double bonds or be non-aromatic, partly aromatic or wholly aromatic in character. The ring systems may be monocyclic, bicyclic or fused. Each "Het" group identified herein is optionally substituted by one or more substituents selected from halo, cyano, nitro, oxo, lower alkyl (which alkyl group may itself be optionally substituted or terminated as defined below) $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$ or $C(S)NR^{25}R^{26}$ wherein $R^{19}$ to $R^{27}$ each independently represent hydrogen, aryl or lower alkyl (which alkyl group itself may be optionally substituted or terminated as defined below). The term "Het" thus includes groups such as optionally substituted azetidinyl, pyrrolidinyl, imidazolyl, indolyl, furanyl, oxazolyl, isoxazolyl, oxadiazolyl, thiazolyl, thiadiazolyl, triazolyl, oxatriazolyl, thiatriazolyl, pyridazinyl, morpholinyl, pyrimidinyl, pyrazinyl, quinolinyl, isoquinolinyl, piperidinyl, pyrazolyl and piperazinyl. Substitution at Het may be at a carbon atom of the Het ring or, where appropriate, at one or more of the heteroatoms.

"Het" groups may also be in the form of an N oxide.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" hydroxy functional alkyl polyurea, "a" film forming resin, "an" isocyanate, "an" alkanol amine, "the" residue of "an", and the like, one or more of each of these and any other components can be used. As used herein, the term "polymer" refers to oligomers and both homopolymers and copolymers, and the prefix "poly" refers to two or more. Including, for example and like terms means including for example but not limited to.

All of the features contained herein may be combined with any of the above aspects and in any combination.

For a better understanding of the invention, and to show how embodiments of the same may be carried into effect, reference will now be made, by way of example, to the following experimental data.

EXAMPLES

Polymer Examples

Solution Acrylic Example 1

Solution acrylic example 1 was prepared according to the formulation in Table 1 and by the following method. All amounts are given in parts by weight (pbw) unless otherwise specified.

The polymerisation was carried out in a reactor equipped with heating, cooling, stirring and a water-cooled reflux condenser. A sparge of nitrogen was applied to the reactor to provide an inert atmosphere. Component 1 was charged to the reactor and heated to reflux at a temperature of 120 to 125° C. with stirring at a speed of 300 rpm. A monomer mixture containing components 4, 5 and 6 and an initiator mixture comprising components 2 and 3 were prepared separately and added to a monomer tank and an initiator tank, respectively. The monomer mixture (components 4, 5 and 6) and initiator mixture (components 2 and 3) were then fed to the reactor at 120 to 125° C. over a period of 180 minutes. At the end of the monomer/initiator feed, component 7 was added as a line wash and the reactor was maintained at reflux at 120 to 125° C. for an additional 60 minutes. A chase feed of initiator containing components 8 and 9 was then added to the reactor over 20 minutes. The reactor was then held for 60 minutes at reflux at 120 to 125° C. After this time, the reactor (containing the reaction mixture) was allowed to cool by removing the heat.

When the reaction mixture was 90° C., a pre-mix of components 10 and 11 was added over a period of 10 minutes. The reactor was held at 90° C. for 10 minutes before being allowed to cool to below 40° C. The resultant solution polymerised acrylic material was then removed from the reactor.

TABLE 1

Formulation of Solution Acrylic Example 1
Solution Acrylic Example 1

| | Component | Amount/pbw |
|---|---|---|
| 1 | n-butanol | 3017.12 |
| 2 | t-butyl peroctoate | 21.00 |
| 3 | n-butanol | 210.00 |
| 4 | Acrylic acid | 735.00 |
| 5 | Butyl methacrylate | 1540.00 |
| 6 | Butyl acrylate | 1225.00 |
| 7 | n-butanol | 68.29 |
| 8 | t-butyl peroctoate | 29.75 |
| 9 | n-butanol | 119.00 |
| 10 | Dimethylethanolamine (DMEA) | 454.61 |
| 11 | Deionised water | 379.38 |
| | Total | 7799.15 |

Solution Acrylic Example 2

Solution acrylic example 2 was prepared according to the formulation in Table 2 and by the following method. All amounts are given in parts by weight (pbw) unless otherwise specified.

The polymerisation was carried out in a 5 L flask equipped with heating, cooling, stirring and a water-cooled reflux condenser. A sparge of nitrogen was applied to the flask to provide an inert atmosphere. Components 1 and 2 were charged to the flask and heated to reflux at a temperature of 135° C. with stirring. A monomer mixture containing components 5, 6 and 7 and an initiator mixture comprising components 3 and 4 were prepared separately. The monomer mixture (components 5, 6 and 7) and initiator mixture (components 3 and 4) were then fed to the flask via a feed funnel at 135° C. over a period of 180 minutes. At the end of the monomer/initiator feed, component 8 was added as wash for the feed funnel and the flask was maintained at reflux at 135° C. for an additional 60 minutes. A chase feed of initiator containing components 9 and 10 was then added to the flask over 20 minutes. The flask was then held for 60 minutes at reflux at 135° C. After this time, the flask (containing the reaction mixture) was allowed to cool to below 110° C. by removing the heat before component 11 was added. Then, a pre-mix of components 12 and 13 was added over a period of 10 minutes. After this time, the flask (containing the reaction mixture) was allowed to cool to below 40° C. by removing the heat.

The resultant solution polymerised acrylic material was then removed from the flask.

TABLE 2

Formulation of Solution Acrylic Example 2
Solution Acrylic Example 2

| | Component | Amount/pbw |
|---|---|---|
| 1 | Ethylene Glycol n-butyl ether | 407.2 |
| 2 | n-butyl alcohol | 186.9 |
| 3 | t-butyl peroxy-3,5,5-trimethylhexanoate | 4.0 |
| 4 | Ethylene Glycol n-butyl ether | 40.0 |
| 5 | Butyl acrylate | 350.0 |
| 6 | Butyl methacrylate | 440.0 |
| 7 | Acrylic acid | 210.0 |
| 8 | Ethylene Glycol n-butyl ether | 7.5 |
| 9 | t-butyl peroxy-3,5,5-trimethylhexanoate | 8.5 |
| 10 | Ethylene Glycol n-butyl ether | 12.9 |
| 11 | n-butyl alcohol | 186.9 |
| 12 | Dimethylethanolamine | 130.1 |
| 13 | Deionised water | 93.5 |
| | Total | 2077.5 |

Acrylic Latex Example 1

Latex acrylic example 1 was prepared according to the formulation in Table 3 and by the following method. All amounts are given in parts by weight (pbw) unless otherwise specified.

The polymerisation was carried out in a reactor equipped with heating, cooling, stirring and a water-cooled reflux condenser. A sparge of nitrogen was applied to the reactor to provide an inert atmosphere. Components 1 and 2 were charged to the reactor and heated to 80° C. with stirring at a speed of 300 rpm. A monomer mixture containing components 3 to 6 and an initiator mixture containing components 7 and 8 were prepared separately and added to a monomer tank and initiator tank, respectively. The initiator mixture (components 7 and 8) was then fed to the reactor dropwise over a period of 20 minutes. At the end of the initiator feed, the reactor was held for 5 minutes. Then, the monomer mixture (components 3 to 6) was charged to the reactor at 80° C. over 240 minutes as follows:

0 to 60 minutes: 280 g of monomer mixture
    61 to 120 minutes: 560 g of monomer mixture
    121 to 180 minutes: 980 g of monomer mixture
    181 to 240 minutes: 980 g of monomer mixture At the end of the monomer feed, the reactor was held for 60 minutes at 80° C. After this time, the reactor was allowed to cool to below 50° C. by removing the heat. Once the reactor was cooled, a pre-mix of components 9 and 10 were added drop-wise over a period of 30 minutes. The resultant emulsion polymerised acrylic latex material was then removed from the reactor.

TABLE 3

Formulation of Latex Acrylic Example 1
Latex Acrylic Example 1

| | Component | Amount/pbw |
|---|---|---|
| 1 | Deionised water | 4565.68 |
| 2 | Sodium bicarbonate | 6.53 |
| 3 | Acrylic acid | 280.00 |
| 4 | Butyl methacrylate | 1120.00 |
| 5 | Butyl acrylate | 840.00 |
| 6 | Methyl methacrylate | 560.00 |
| 7 | Deionised water | 985.60 |
| 8 | Ammonium persulfate | 12.32 |
| 9 | Dimethylethanolamine (DMEA) | 86.64 |
| 10 | Deionised water | 1212.96 |
| | Total | 9669.73 |

Acrylic Latex Example 2

Latex acrylic example 2 was prepared according to the formulation in Table 4 and by the following method. All amounts are given in parts by weight (pbw) unless otherwise specified.

The polymerisation was carried out in a reactor equipped with heating, cooling, stirring and a water-cooled reflux condenser. A sparge of nitrogen was applied to the reactor to provide an inert atmosphere. Components 1 and 2 were charged to the reactor and heated to 85° C. with stirring at a speed of 275 rpm. A monomer mixture containing components 5 to 10 and an initiator mixture containing components 3 and 4 were prepared separately and added to a monomer tank and initiator tank, respectively. The initiator mixture (components 3 and 4) was then fed to the reactor dropwise over a period of 20 minutes. At the end of the initiator feed, the reactor was held for 5 minutes. Then, the monomer mixture (components 5 to 10) was charged to the reactor at 80° C. over 240 minutes at a rate of 4.42 g/minute. At the same time as the monomer mixture (components 5 to 10), a pre-mix of components 11 and 12 was added to the reactor over 240 minutes at a rate of 0.4125 g/minute.

At the end of the monomer feed, the reactor was held for 60 minutes at 85° C. After this time, the reactor was allowed to cool to below 50° C. by removing the heat. Once the reactor was cooled, a pre-mix of components 13 and 14 were added over a period of 30 minutes. The reactor was then held for 10 minutes before the resultant emulsion polymerised acrylic latex material was removed from the reactor.

TABLE 4

Formulation of Latex Acrylic Example 2
Latex Acrylic Example 2

| | Component | Amount/pbw |
|---|---|---|
| 1 | Deionised water | 1491.60 |
| 2 | Sodium bicarbonate | 4.31 |
| 3 | Deionised water | 167.34 |
| 4 | Ammonium persulfate | 2.20 |
| 5 | Butyl methacrylate | 273.00 |
| 6 | Methyl methacrylate | 274.20 |
| 7 | Butyl acrylate | 295.80 |
| 8 | Acrylic acid | 52.80 |
| 9 | Methacrylic acid | 152.50 |
| 10 | Benzoin | 10.50 |
| 11 | Hydrogen peroxide (35% solution) | 9.00 |
| 12 | Deionised water | 89.90 |
| 13 | Dimethylethanolamine | 57.30 |
| 14 | Deionised water | 684.43 |
| | Total | 3564.88 |

Coating Composition Examples

Coating Example 1

Coating composition example 1 was prepared according to the formulation in Table 5 and by the following method.

Component 2 was added gradually to component and mixed under stirring. The mixture was stirred until good mixing was achieved. Then, component 3 was added followed by component 4. Next, component 5 was added to the mixture. The solvents, components 6, 7 and 8, were added sequentially with the mixture being left for a couple of minutes between each addition to allow for good incorporation to be achieved. Then, component 9 was added gradually to adjust the pH and viscosity.

TABLE 5

Formulation of Coating Example 1

| | | Coating Composition Example 1 | | |
|---|---|---|---|---|
| | Component | Wet/g | Solid/g | % solid |
| 1 | Acrylic Latex Example 1 [1] | 59.1 | 17.7 | 85.6 |
| 2 | Solution Acrylic Example 1 [2] | 4.2 | 2.1 | 10.2 |
| 3 | Deionised water | 20.0 | — | — |
| 4 | PRIMID QM 1260 [3] | 2.7 | 0.8 | 4.0 |
| 5 | Neutralised phosphoric acid [4] | 0.5 | 0.1 | 0.2 |
| 6 | n-butanol | 3.7 | — | — |
| 7 | Amyl alcohol | 3.5 | — | — |
| 8 | Butyl cellosolve | 5.3 | — | — |
| 9 | Dimethylethanolamine (DMEA) | 1.00 | — | — |
| | Total | 100 | 20.7 | 100 |

[1] 30% solids
[2] 45% solids
[3] 30% β-hydroxyalkylamide crosslinker (available from EMS-GRILTECH) in deionised water
[4] catalyst containing 10% phosphoric acid and 16% Dimethylethanolamine (DMEA) in deionised water

Coating Example 2

Coating composition example 2 was prepared according to the formulation in Table 6.

TABLE 6

Formulation of Coating Example 2

| | | Coating Composition Example 2 | | |
|---|---|---|---|---|
| | Component | Wet/g | Solid/g | % solid |
| 1 | Acrylic Latex Example 2 [1] | 82.0 | 263.7 | 82.0 |
| | Solution Acrylic Example 2 [2] | 10.0 | 19.0 | 10.0 |
| 2 | Deionised water | 236.8 | — | — |
| 3 | CURAPHEN 40-804 W75 [3] | 8.0 | 10.8 | 8.0 |
| 4 | n-butanol | 25.5 | — | — |
| 5 | Ethylene glycol n-butyl ether | 9.7 | — | — |
| 6 | Amyl alcohol | 10.0 | — | — |
| 7 | Dimethylethanolamine (DMEA) | 2.0 | — | — |
| | Total | 577.5 | 100 | 100 |

[1] 31.1% solids
[2] 52.5% solids
[3] 74% phenolic resole resin (available from BITREZ Ltd.)

Coating Example 3

Coating composition example 3 was prepared according to the formulation in Table 7.

TABLE 7

Formulation of Coating Example 3

| | | Coating Composition Example 3 | | |
|---|---|---|---|---|
| | Component | Wet/g | Solid/g | % solid |
| 1 | Acrylic Latex Example 2 [1] | 295.8 | 92.0 | 92.0 |
| 2 | Deionised water | 220.1 | — | — |
| 3 | CURAPHEN 40-804 W75 [2] | 10.8 | 8.0 | 8.0 |
| 4 | n-butanol | 25.5 | — | — |
| 5 | Ethylene glycol n-butyl ether | 9.7 | — | — |
| 6 | Amyl alcohol | 10.0 | — | — |
| 7 | Dimethylethanolamine (DMEA) | 2.0 | — | — |
| | Total | 573.9 | 100 | 100 |

[1] 31.1% solids
[2] 74% phenolic resole resin (available from BITREZ Ltd.)

Comparative Coating Examples 4 to 8

Comparative coatings examples 4 to 8 were prepared according to the formulations in Table 8.

TABLE 8

Formulation of Comparative Coating Examples 4 to 8

| | | Comparative Coating Example 4 | | | Comparative Coating Example 5 | | | Comparative Coating Example 6 | | | Comparative Coating Example 7 | | | Comparative Coating Example 8 | | |
|---|---|---|---|---|---|---|---|---|---|---|---|---|---|---|---|---|
| | Component | Wet/g | Solid/g | % solid | Wet/g | Solid/g | % solid | Wet/g | Solid/g | % solid | Wet/g | Solid/g | % solid | Wet/g | Solid/g | % solid |
| 1 | Acrylic Latex Example 1 [1] | 59.1 | 17.7 | 100 | 59.1 | 17.7 | 95.9 | 59.1 | 17.7 | 99.7 | 59.1 | 17.7 | 95.7 | 59.1 | 17.7 | 89.9 |
| 2 | Solution Acrylic Example 1 [2] | — | — | — | — | — | — | — | — | — | — | — | — | 4.0 | 2.0 | 10.1 |
| 3 | Deionised water | 27.5 | — | — | 25.0 | — | — | 27.0 | — | — | 24.5 | — | — | 23.5 | — | — |
| 4 | PRIMID QM 1260 [3] | — | — | — | 2.5 | 0.8 | 4.1 | — | — | — | 2.5 | 0.8 | 4.0 | — | — | — |
| 5 | Neutralised phosphoric acid [4] | — | — | — | — | — | — | 0.5 | 0.1 | 0.3 | 0.5 | 0.1 | 0.3 | — | — | — |
| 6 | n-butanol | 3.7 | — | — | 3.7 | — | — | 3.7 | — | — | 3.7 | — | — | 3.7 | — | — |
| 7 | Amyl alcohol | 3.5 | — | — | 3.5 | — | — | 3.5 | — | — | 3.5 | — | — | 3.5 | — | — |
| 8 | Butyl cellosolve | 5.3 | — | — | 5.3 | — | — | 5.3 | — | — | 5.3 | — | — | 5.3 | — | — |
| 9 | Dimethylethanolamine (DMEA) | 1.0 | — | — | 1.0 | — | — | 1.0 | — | — | 1.0 | — | — | 1.0 | — | — |
| | Total | 100 | 17.7 | 100 | 100 | 18.5 | 100 | 100 | 17.8 | 100 | 100 | 18.5 | 100 | 100 | 19.7 | 100 |

[1] 30% solids
[2] 45% solids
[3] 30% β-hydroxyalkylamide crosslinker (available from EMS-GRILTECH) in deionised water
[4] catalyst containing 10% phosphoric acid and 16% Dimethylethanolamine (DMEA) in deionised water The properties of the coatings were then tested by the following methods. The results are shown in Tables 9 and 10.

Test Methods

Test Panel Preparation:

Coated panels were prepared by coating flat aluminium cans using a bar coater. The dry film weight for the coating layer was 5 to 6 g/m² (gsm). After application, the coated panels were baked in a box oven for 1 minute 45 seconds at 215° C.

Wedge Bend Test:

A 10 cm×4 cm coated panel was bent on a 6 mm steel rod to form a U-shaped strip 10 cm long and 2 cm wide. The U-shaped strip was then placed onto a metal block with a built in tapered recess. A 2 kg weight was dropped onto the recessed block containing the U-shaped strip from a height of 60 cm in order to from a wedge. The test piece was then immersed in a copper sulphate (CuSO₄) solution acidified with hydrochloric acid (HCl) for 2 minutes, followed by rinsing with tap water. The sample was then carefully dried by blotting any residual water with tissue paper. The length of coating without any fracture was measured. The result was quoted in mm passed. The wedge bends were tested in triplicate and the average value was quoted.

Processing in Various Simulants:

Coated panels cut into 10 cm×5 cm panels were placed in a container containing one of 5% acetic acid, deionised water or 1% Joy solution such that the panel was submerged in the solution. The container was then placed in an autoclave and processed according to the parameters in Tables 9 and 10 (i.e. 30 minutes at 100° C., 45 minutes at 82° C. or 10 minutes at 82° C. for 5% acetic acid, deionised water or 1% Joy solution, respectively). After this time, the panels were assessed by the following methods:

Gloss Surface Modification:

The processed panels were assessed visually for gloss surface modification and rated on a scale of 0 to 5. A score of 0 corresponds to no damage/defect and a score of 5 corresponds to severe damage/defect.

Adhesion:

The processed panels were tested for coating adhesion to the aluminium substrate using a BYK Cross-Cut Tester Kit #5127 (commercially available from BYK-Gardner GmbH) in accordance with ASTM D3359. The cutter spacing was 1.5 mm and Scotch 610 tape was used. The results were rated on a scale of 0 to 5. Grade 0 corresponds to good adhesion with no removal of coating and grade 5 to complete loss of adhesion.

TABLE 9

Test Results for Coating Examples 1-3

|  | Coating Example 1 | Coating Example 2 | Coating Example 3 |
|---|---|---|---|
| Wedge Bend Test | 96 | 55 | 50 |
| 5% acetic acid, 30 mins, 100° C. | | | |
| Adhesion | 0 | 0 | 0 |
| Gloss surface modification | 0 | Not tested | Not Tested |
| Deionised water, 45 mins, 82° C. | | | |
| Adhesion | — | 0 | 0 |
| 1% Joy Detergent, 10 mins, 82° C. | | | |
| Adhesion | — | 0 | 0 |

TABLE 10

Test Results for Comparative Coating Examples 4-8

|  | Comparative Example 4 | Comparative Example 5 | Comparative Example 6 | Comparative Example 7 | Comparative Example 8 |
|---|---|---|---|---|---|
| Wedge Bend Test | 96 | 99 | 98 | 99 | 98 |
| 5% acetic acid, 30 mins, 100° C. | | | | | |
| Adhesion | 4 | 2 | 5 | 5 | 5 |
| Gloss surface modification | 5 | 5 | 5 | 0 | 4 |

The results show that the coating composition according to the present invention perform as well, or better, than the coatings of the comparative examples. In particular, the coating composition according to the present invention has improved adhesion compared to coatings of the comparative examples.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A food and/or beverage package coated on at least a portion thereof with a coating, the coating being derived from a coating composition, the coating composition comprising:
   a) a solution polymerised acrylic material;
   b) an emulsion polymerised acrylic latex material, wherein one or both of the solution polymerised acrylic material and the emulsion polymerised acrylic latex material have acid functionality; and
   c) a crosslinker material operable to crosslink the acid functionality on the solution polymerised acrylic material and/or emulsion polymerised acrylic latex material;
   wherein the crosslinker material is hydroxyalkylamide crosslinker comprising a polyhydroxyalkylamide material having the formula (IV):

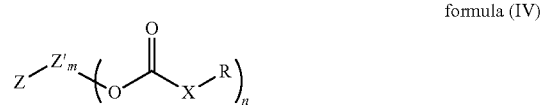

formula (IV)

wherein Z represents a polymer or an alkylene, alkenylene, alkynylene or arylene group; Z' represents a bivalent organic linking group; m is 0 or 1; X represents a bivalent organic bridging group; R represents a hydroxyalkylamide group; and n is at least 2.

2. The food and/or beverage package of claim 1, wherein the solution polymerised acrylic material is formed from acrylic acid, methacrylic acid, ethyl acrylate, ethyl methacrylate, butyl methacrylate, butyl acrylate or combinations thereof.

3. The food and/or beverage package of claim 1, wherein the emulsion polymerised acrylic latex material is formed from acrylic acid, methacrylic acid, ethyl acrylate, ethyl methacrylate, butyl methacrylate, butyl acrylate, methyl methacrylate or combinations thereof.

4. The food and/or beverage package of any claim 1, wherein the solution polymerised acrylic material and/or the emulsion polymerised acrylic latex material is completely free of styrene.

5. The food and/or beverage package of claim 1, wherein the emulsion polymerised acrylic latex material is obtained by a method comprising the steps of:
 i) adding an initiator to an aqueous carrier to form an aqueous initiator mixture;
 ii) adding a monomer component comprising one or more acrylic monomer(s) to the aqueous initiator mixture of step i) to form an aqueous dispersion; and
 iii) polymerising the aqueous dispersion to form an emulsion polymerised acrylic latex material,
 wherein the monomer component is added to the aqueous initiator mixture of step i) over a time period, T, of 1 to 24 hours.

6. The food and/or beverage package of claim 1, wherein the emulsion polymerised acrylic latex material is obtained by a method comprising the steps of:
 i) adding an initiator to an aqueous carrier to form an aqueous initiator mixture;
 ii) adding a monomer component comprising one or more acrylic monomer(s) to the aqueous initiator mixture of step i) to form an aqueous dispersion; and
 iii) polymerising the aqueous dispersion to form an emulsion polymerised acrylic latex material,
 wherein the monomer component has a partition coefficient of at least 1.

7. The food and/or beverage package of-claim 1, wherein the crosslinker material further comprises a phenolic resin.

8. The food and/or beverage package of claim 1, wherein the coating composition comprises less than 6 wt. % of crosslinker material, based on the total solid weight of the coating composition.

9. The food and/or beverage package of claim 1, wherein the coating composition comprises phosphoric acid or derivatives thereof.

10. The food and/or beverage package of claim 1, wherein the coating composition comprises from 0.001 to 10 wt. % of phosphoric acid or derivatives thereof based on the total solid weight of the coating composition.

11. The food and/or beverage package of claim 1, wherein the coating composition is a spray composition.

12. The food and/or beverage package of claim 1, wherein the coating is coated on at least a portion of an interior surface of the food and/or beverage package.

13. The food and/or beverage package of claim 1, wherein the package is a metal can.

14. The food and/or beverage package of claim 1, wherein the emulsion polymerised acrylic latex material comprises less than 0.01 wt. % of surfactant, based on a total weight of the emulsion polymerized acrylic latex.

* * * * *